United States Patent
Aemisegger et al.

(10) Patent No.: US 8,850,957 B2
(45) Date of Patent: Oct. 7, 2014

(54) MODULAR ASSEMBLY OF A BEVERAGE PREPARATION MACHINE

(75) Inventors: Steve Aemisegger, Neuchâtel (CH); Leo Bühler, Wädenswil (CH); Stefan Etter, Kehrsatz (CH); Urs Gaudenz, Wetzikon (CH); Gilles Gavillet, Ursy (CH); Thomas Hodel, Hagendorn (CH); Alexandre Kollep, Lutry (CH); Markus Lang, Wabern (CH); Michael Meier, Kloten (CH); Peter Möri, Walperswil (CH); Renzo Moser, Gümmenen (CH); Peter Preisig, Herisau (CH); Rudolf Schenk, Konolfingen (CH); Robin Schwab, Zürich (CH)

(73) Assignee: Nestec S.A., Vevey (CH)

( * ) Notice: Subject to any disclaimer, the term of this patent is extended or adjusted under 35 U.S.C. 154(b) by 568 days.

(21) Appl. No.: 12/989,072

(22) PCT Filed: Mar. 23, 2009

(86) PCT No.: PCT/EP2009/053368
§ 371 (c)(1),
(2), (4) Date: Oct. 21, 2010

(87) PCT Pub. No.: WO2009/130099
PCT Pub. Date: Oct. 29, 2009

(65) Prior Publication Data
US 2011/0041696 A1 Feb. 24, 2011

Related U.S. Application Data

(63) Continuation-in-part of application No. PCT/EP2008/060463, filed on Aug. 8, 2008, and a (Continued)

(30) Foreign Application Priority Data

Apr. 22, 2008 (EP) .................................. 08154918
May 22, 2008 (EP) .................................. 08156704
May 28, 2008 (EP) .................................. 08157066
Jul. 14, 2008 (EP) .................................. 08160340

(51) Int. Cl.
*A47J 31/047* (2006.01)
*A47J 31/36* (2006.01)
*A47J 31/44* (2006.01)

(52) U.S. Cl.
CPC .......... *A47J 31/3676* (2013.01); *A47J 2201/00* (2013.01); *A47J 31/4403* (2013.01); *A47J 31/3623* (2013.01)
USPC ............................................... 99/281; 29/469

(58) Field of Classification Search
USPC ........ 99/284, 290, 295, 302 P, 302 R; 29/469
See application file for complete search history.

(56) References Cited

U.S. PATENT DOCUMENTS 1,437,005 A 11/1922 Newsom
(Continued)

FOREIGN PATENT DOCUMENTS

CA 2656200 1/2008
(Continued)

OTHER PUBLICATIONS

European Opposition, Appln. No. EP08802980.0, Published evidence, Article: Door Jaqueline Bosboom, "Thuis expresso zetten van professionele allure", (1 page) Jun. 19, 2004.
(Continued)

*Primary Examiner* — Tu B Hoang
*Assistant Examiner* — Brandon Harvey
(74) *Attorney, Agent, or Firm* — Winston & Strawn LLP

(57) ABSTRACT

A process for manufacturing a beverage preparation machine by providing a group of interconnected components which include a brewing unit for receiving a beverage ingredient beverage and a liquid; an in-line heater for the liquid; a pump; one or more fluid connecting members; an electric control unit for receiving instructions from a user via an interface and for controlling the heater and pump; and one or more electric sensors for sensing at least one operational characteristic of the brewing unit, the heater, the pump, a liquid reservoir, an ingredient collector, a flow of the liquid, a pressure of the liquid and a temperature of the liquid and for communicating the characteristic(s) to the control unit. At least two or three modules, each containing at least two components, are pre-assembled such that the components are automatically seizable, orientable, positionable and fully connectable to each other.

19 Claims, 12 Drawing Sheets

Related U.S. Application Data continuation-in-part of application No. PCT/EP2008/063092, filed on Sep. 30, 2008, and a continuation-in-part of application No. PCT/EP2008/063128, filed on Oct. 1, 2008.

(56) References Cited

U.S. PATENT DOCUMENTS

| | | | |
|---|---|---|---|
| 1,513,685 A | 10/1924 | Ardovino | |
| 2,514,360 A | 7/1950 | Alvarez | 219/39 |
| 2,715,868 A | 8/1955 | Brown | 99/302 |
| 3,260,190 A | 7/1966 | Levinson | 99/295 |
| 3,286,618 A | 11/1966 | Barrera | 99/302 |
| 3,320,572 A | 5/1967 | Schwartz | 339/17 |
| 3,374,979 A | 3/1968 | Coldren et al. | 248/222.12 |
| 3,622,750 A | 11/1971 | Watts, Jr. | |
| 3,919,520 A | 11/1975 | Pickard | 219/208 |
| 4,242,568 A | 12/1980 | Wunderlin et al. | 219/296 |
| 4,320,626 A | 3/1982 | Donnelly | 62/3 |
| 4,551,611 A | 11/1985 | Longo | 392/451 |
| 4,589,374 A | 5/1986 | Farina | 122/18.31 |
| 4,595,131 A | 6/1986 | Ruskin et al. | 222/640 |
| 4,760,774 A | 8/1988 | Lin | 99/299 |
| 4,871,089 A | 10/1989 | Rader et al. | 222/54 |
| 4,949,627 A | 8/1990 | Nordskog | 99/281 |
| 5,019,690 A | 5/1991 | Knepler | 219/400 |
| 5,063,836 A * | 11/1991 | Patel | 99/281 |
| 5,161,455 A | 11/1992 | Anson et al. | |
| 5,257,341 A | 10/1993 | Austin, Jr. et al. | 392/487 |
| 5,392,694 A | 2/1995 | Muller et al. | 99/295 |
| 5,531,152 A * | 7/1996 | Gardosi | 99/289 R |
| 5,709,574 A | 1/1998 | Bianca et al. | |
| 5,755,149 A * | 5/1998 | Blanc et al. | 99/289 T |
| 5,776,527 A | 7/1998 | Blanc | 426/77 |
| 5,794,519 A | 8/1998 | Fischer | 99/295 |
| 5,836,236 A | 11/1998 | Rolfes et al. | 99/290 |
| 5,855,161 A | 1/1999 | Cortese | |
| 5,901,636 A * | 5/1999 | Witziers et al. | 99/283 |
| 5,943,472 A | 8/1999 | Charles et al. | 392/396 |
| 5,957,033 A | 9/1999 | In-Albon | |
| 5,992,298 A | 11/1999 | Illy et al. | 99/281 |
| 6,009,792 A | 1/2000 | Kraan | |
| 6,025,000 A | 2/2000 | Fond et al. | |
| 6,026,732 A | 2/2000 | Kollep et al. | |
| 6,032,481 A | 3/2000 | Mosby | 62/457.2 |
| 6,035,762 A | 3/2000 | Ruckstuhl | |
| 6,036,530 A | 3/2000 | Edwards et al. | 439/455 |
| 6,062,732 A | 5/2000 | Scott | 383/24 |
| 6,098,525 A | 8/2000 | Gijzel et al. | 99/282 |
| 6,389,226 B1 | 5/2002 | Neale et al. | 392/485 |
| 6,393,967 B2 | 5/2002 | Fischer | 99/285 |
| 6,453,800 B1 | 9/2002 | Chen | 99/289 |
| 6,554,588 B1 | 4/2003 | DiBenedetto | 417/417 |
| 6,698,332 B2 | 3/2004 | Kollep et al. | |
| 6,748,850 B1 | 6/2004 | Kraan | |
| 6,889,598 B2 | 5/2005 | Wroblewski | 99/275 |
| 6,954,973 B2 * | 10/2005 | Zirbs | 29/407.04 |
| 6,966,251 B2 | 11/2005 | Yoakim | 99/295 |
| 6,994,015 B2 | 2/2006 | Bruinsma | |
| 7,017,474 B2 * | 3/2006 | Comte | 99/302 P |
| 7,077,053 B2 | 7/2006 | Kraan | |
| 7,131,369 B2 | 11/2006 | Gantt et al. | 99/289 R |
| 7,165,488 B2 | 1/2007 | Bragg et al. | 99/295 |
| 7,231,869 B2 | 6/2007 | Halliday et al. | |
| 7,286,752 B2 * | 10/2007 | Gourand | 392/479 |
| 7,287,461 B2 | 10/2007 | Halliday et al. | |
| 7,316,178 B2 | 1/2008 | Halliday et al. | |
| 7,383,763 B2 | 6/2008 | Dijs | |
| 7,418,899 B2 | 9/2008 | Halliday et al. | |
| 7,444,927 B1 | 11/2008 | Crosville et al. | |
| 7,562,618 B2 | 7/2009 | Jarisch et al. | |
| 7,569,243 B2 | 8/2009 | Yoakim et al. | |
| 7,703,380 B2 | 4/2010 | Ryser et al. | 99/295 |
| 7,740,511 B2 | 6/2010 | Katano | |
| 7,959,090 B2 | 6/2011 | Shank et al. | |
| 2002/0148357 A1 | 10/2002 | Lazaris et al. | 99/295 |
| 2003/0019367 A1 | 1/2003 | Fogagnolo et al. | 99/330 |
| 2003/0047080 A1 | 3/2003 | Wu | 99/279 |
| 2003/0066431 A1 | 4/2003 | Fanzutti et al. | 99/279 |
| 2004/0031394 A1 | 2/2004 | Yoakim et al. | 99/279 |
| 2004/0101293 A1 | 5/2004 | Bissonnette et al. | 392/484 |
| 2004/0250686 A1 | 12/2004 | Hale | 99/295 |
| 2004/0264951 A1 | 12/2004 | Kuebler et al. | |
| 2005/0106288 A1 | 5/2005 | Blanc et al. | 426/77 |
| 2005/0107919 A1 | 5/2005 | Watanabe et al. | |
| 2005/0183578 A1 * | 8/2005 | Mandralis et al. | 99/279 |
| 2005/0235834 A1 | 10/2005 | Blanc et al. | 99/279 |
| 2006/0102008 A1 | 5/2006 | Lin | 99/279 |
| 2007/0012685 A1 | 1/2007 | Gourand | 219/628 |
| 2007/0044664 A1 | 3/2007 | Wang | 99/279 |
| 2007/0104837 A1 | 5/2007 | Yoakim et al. | 426/77 |
| 2008/0006159 A1 | 1/2008 | Fischer | 99/289 R |
| 2008/0028947 A1 | 2/2008 | Magg et al. | 99/288 |
| 2008/0090473 A1 | 4/2008 | Katano | |
| 2008/0203870 A1 | 8/2008 | Riley et al. | 312/265.6 |
| 2008/0236403 A1 | 10/2008 | Cortese | 99/323 |
| 2008/0273868 A1 | 11/2008 | Boussemart et al. | 392/479 |
| 2009/0154909 A1 | 6/2009 | Meyer | 392/473 |
| 2009/0205503 A1 | 8/2009 | Cortese | 99/295 |
| 2009/0249961 A1 | 10/2009 | Cheng | 99/289 R |
| 2009/0308259 A1 | 12/2009 | Hiron | 99/323.3 |
| 2010/0011965 A1 | 1/2010 | Turi | 99/289 R |
| 2010/0071563 A1 | 3/2010 | Ryser et al. | 99/295 |
| 2010/0101428 A1 | 4/2010 | Fin | 99/295 |
| 2010/0173053 A1 | 7/2010 | Ryser et al. | 426/431 |
| 2010/0206177 A1 | 8/2010 | Ricotti | 99/295 |
| 2010/0218684 A1 | 9/2010 | Etter et al. | 99/288 |
| 2010/0224077 A1 | 9/2010 | Jing | 99/295 |
| 2010/0282090 A1 | 11/2010 | Etter et al. | 99/288 |
| 2010/0288132 A1 | 11/2010 | Gavillet et al. | 99/295 |
| 2011/0000377 A1 | 1/2011 | Favre | 99/289 R |
| 2011/0126717 A1 | 6/2011 | Gavillet et al. | 99/288 |

FOREIGN PATENT DOCUMENTS

| | | |
|---|---|---|
| CH | 503630 | 2/1971 |
| CH | 593 044 | 11/1977 |
| CH | 593630 | 2/1978 |
| CH | 682798 A5 | 11/1993 |
| CN | 137742 A | 12/1996 |
| CN | 1476304 A | 2/2004 |
| CN | 1905827 A | 1/2007 |
| CN | 1919121 | 2/2007 |
| CN | 101073470 A | 11/2007 |
| CN | 101162809 A | 4/2008 |
| DE | 1 590 068 | 4/1970 |
| DE | 2 019 445 | 11/1971 |
| DE | 196 47 039 C2 | 7/1997 |
| DE | 197 37 694 C1 | 10/1998 |
| DE | 197 32 414 A1 | 2/1999 |
| DE | 103 22 034 A1 | 12/2004 |
| EP | 0 387 515 A1 | 9/1990 |
| EP | 0 485 211 B1 | 5/1992 |
| EP | 0 512 142 A1 | 11/1992 |
| EP | 0 512 148 A1 | 11/1992 |
| EP | 0 602 203 B1 | 6/1994 |
| EP | 0 604 615 A1 | 7/1994 |
| EP | 0 730 425 B1 | 9/1996 |
| EP | 0 761 150 A1 | 3/1997 |
| EP | 0 784 955 B1 | 7/1997 |
| EP | 0 862 882 B1 | 9/1998 |
| EP | 0 891 734 A1 | 1/1999 |
| EP | 0 904 717 A1 | 3/1999 |
| EP | 1050258 B1 | 11/2000 |
| EP | 1 121 882 B1 | 8/2001 |
| EP | 1 133 010 A1 | 9/2001 |
| EP | 1153561 B1 | 11/2001 |
| EP | 1 208 782 B1 | 5/2002 |
| EP | 1 219 217 B1 | 7/2002 |
| EP | 1 253 844 B1 | 11/2002 |
| EP | 1 299 022 B1 | 4/2003 |
| EP | JP 2003-512117 A | 4/2003 |
| EP | 1 380 243 B1 | 1/2004 |
| EP | 1 480 540 B1 | 12/2004 |

(56) References Cited

FOREIGN PATENT DOCUMENTS

| | | |
|---|---|---|
| EP | 1 486 150 B1 | 12/2004 |
| EP | 1 495 702 A1 | 1/2005 |
| EP | 1 529 469 A1 | 5/2005 |
| EP | 1 610 596 B1 | 12/2005 |
| EP | 1 635 680 B1 | 3/2006 |
| EP | 1 646 305 B1 | 4/2006 |
| EP | 1 659 547 A1 | 5/2006 |
| EP | 1 669 011 A1 | 6/2006 |
| EP | 1 721 553 B1 | 11/2006 |
| EP | 1 757 212 A1 | 2/2007 |
| EP | 1 774 878 B1 | 4/2007 |
| EP | 1 774 884 A1 | 4/2007 |
| EP | 1 775 234 A1 | 4/2007 |
| EP | 1 776 026 B1 | 4/2007 |
| EP | 1 809 151 B1 | 7/2007 |
| EP | 1 829 469 B1 | 9/2007 |
| EP | 1 864 598 A1 | 12/2007 |
| EP | 1 878 368 B1 | 1/2008 |
| EP | 1 893 064 B1 | 3/2008 |
| EP | 1 809 151 B1 | 9/2008 |
| EP | 1859714 B1 | 2/2009 |
| EP | 2 103 236 A1 | 9/2009 |
| EP | 2 181 629 A1 | 5/2010 |
| EP | 2 218369 A1 | 8/2010 |
| EP | 2 218 368 A2 | 8/2010 |
| EP | 2 218 370 A2 | 8/2010 |
| EP | 2 374 383 A1 | 10/2011 |
| FR | 1 358 502 | 3/1963 |
| FR | 2 424 010 A1 | 11/1979 |
| FR | 2745995 | 9/1997 |
| FR | 2 799 630 | 4/2001 |
| FR | 2 799 630 A1 | 4/2001 |
| FR | 2 855 359 | 11/2004 |
| FR | 2855359 A1 * | 11/2004 |
| FR | 2 898 734 | 9/2007 |
| FR | 2904205 | 2/2008 |
| GB | 847662 | 9/1960 |
| JP | H0138493 B2 | 8/1989 |
| JP | 04-34405 B2 | 6/1992 |
| JP | 2002050726 A | 2/2002 |
| JP | 2004-514488 A | 5/2004 |
| JP | 2004173823 A | 6/2004 |
| JP | 2005149216 A | 6/2005 |
| JP | 2006280208 A | 10/2006 |
| JP | 2007501506 A | 1/2007 |
| JP | 2007506474 A | 3/2007 |
| JP | 2009511102 A | 3/2009 |
| JP | 2003-508102 A | 5/2009 |
| LU | 85316 | 9/1984 |
| SU | 1808642 A1 | 4/1993 |
| TW | 322459 | 12/1997 |
| WO | WO 94/01344 A1 | 1/1994 |
| WO | WO 95/07041 | 3/1995 |
| WO | WO 95/17121 A1 | 6/1995 |
| WO | WO 98/47418 A1 | 10/1998 |
| WO | WO 99/51947 | 10/1999 |
| WO | WO 00/45685 A2 | 8/2000 |
| WO | WO 01/30218 A | 5/2001 |
| WO | WO 01/54551 A1 | 8/2001 |
| WO | WO 01/60221 A1 | 8/2001 |
| WO | WO 02/074144 A2 | 9/2002 |
| WO | WO 03/030696 A1 | 4/2003 |
| WO | WO 03/073897 A1 | 9/2003 |
| WO | WO 2004/006742 A1 | 1/2004 |
| WO | WO 2004/069012 A1 | 8/2004 |
| WO | WO2004/105438 A1 | 12/2004 |
| WO | WO 2005/002405 A2 | 1/2005 |
| WO | WO 2005/004683 A1 | 1/2005 |
| WO | WO 2005/016093 A1 | 2/2005 |
| WO | WO 2005058111 A1 | 6/2005 |
| WO | WO 2005/060801 A1 | 7/2005 |
| WO | WO 2005/072574 A1 | 8/2005 |
| WO | WO 2005/072586 A1 | 8/2005 |
| WO | WO 2005/099534 A1 | 10/2005 |
| WO | WO 2006/003116 A1 | 1/2006 |
| WO | WO 2006/005736 A2 | 1/2006 |
| WO | WO 2006/005756 A1 | 1/2006 |
| WO | WO 2006/023309 A2 | 3/2006 |
| WO | WO 2006/066626 A1 | 6/2006 |
| WO | WO 2006/104575 A1 | 10/2006 |
| WO | WO 2007/016977 A1 | 2/2007 |
| WO | WO 2007/039683 A1 | 4/2007 |
| WO | WO 2007/111884 A2 | 10/2007 |
| WO | WO2007/118944 A1 | 10/2007 |
| WO | WO 2007/122144 A1 | 11/2007 |
| WO | WO 2007/135136 A1 | 11/2007 |
| WO | WO2008/004116 A1 | 1/2008 |
| WO | WO2008/012316 A2 | 1/2008 |
| WO | WO 2008014830 A1 | 2/2008 |
| WO | WO 2008/037642 A2 | 4/2008 |
| WO | WO 2008046740 A1 | 4/2008 |
| WO | WO 2008/154805 A1 | 12/2008 |
| WO | WO 2009/043630 A2 | 4/2009 |
| WO | WO 2009/043851 A2 | 4/2009 |
| WO | WO2009/043851 A2 | 4/2009 |
| WO | WO 2009/043865 A2 | 4/2009 |
| WO | WO 2009/074550 A2 | 6/2009 |
| WO | WO 2009/130099 A1 | 10/2009 |
| WO | WO 2010/015427 A1 | 2/2010 |

OTHER PUBLICATIONS

European Opposition Appln. No. EP08802980.0, Published evidence Pictures prior used Essenza (13 pages) Dec. 30, 2011.
European Opposition Appln. No. EP08802980.0, Magimix Nespresso Essenza Instruction Manual, Essenza Automatic with English Translation, (11 pages), Sep. 2004.
U.S. Appl. No. 12/681,577, filed Apr. 2, 2010.
U.S. Appl. No. 12/681,535, filed May 28, 2010.
U.S. Appl. No. 12/681,362, filed Apr. 1, 2010.
International Search Report, PCT/EP2009/053368, mailed Oct. 6, 2009.
International Search Report, PCT/EP2008/060463, mailed Apr. 1, 2009.
International Search Report, PCT/EP2008/063092, mailed Jul. 6, 2009.
International Search Report, PCT/EP2008/063128, May 8, 2009.
Restriction Requirement, U.S. Appl. No. 12/681,362, dated Sep. 17, 2012.
Non-Final Office Action, U.S. Appl. No. 12/681,362, dated Nov. 30, 2012.
Non-Final Office Action, U.S. Appl. No. 12/681,577, dated Jul. 5, 2012.
International Search Report, PCT/EP2009/053139, mailed Jul. 20, 2009.
Restriction Requirement, U.S. Appl. No. 13/055,355, dated Mar. 20, 2013.
Non-Final Office Action, U.S. Appl. No. 12/681,535, dated Mar. 13, 2013.
Notice of Allowance, U.S. Appl. No. 12/681,577, dated Mar. 12, 2013.
Non-Final Office Action U.S. Appl. No. 13/055,355, dated Jun. 20, 2013.
Notice of Allowance U.S. Appl. No. 12/681,362 Jul. 8, 2013.
Restriction Requirement U.S. Appl. No. 12/681,577 May 11, 2012.
Final Office Action U.S. Appl. No. 12/681,577 Jan. 4, 2013.

* cited by examiner

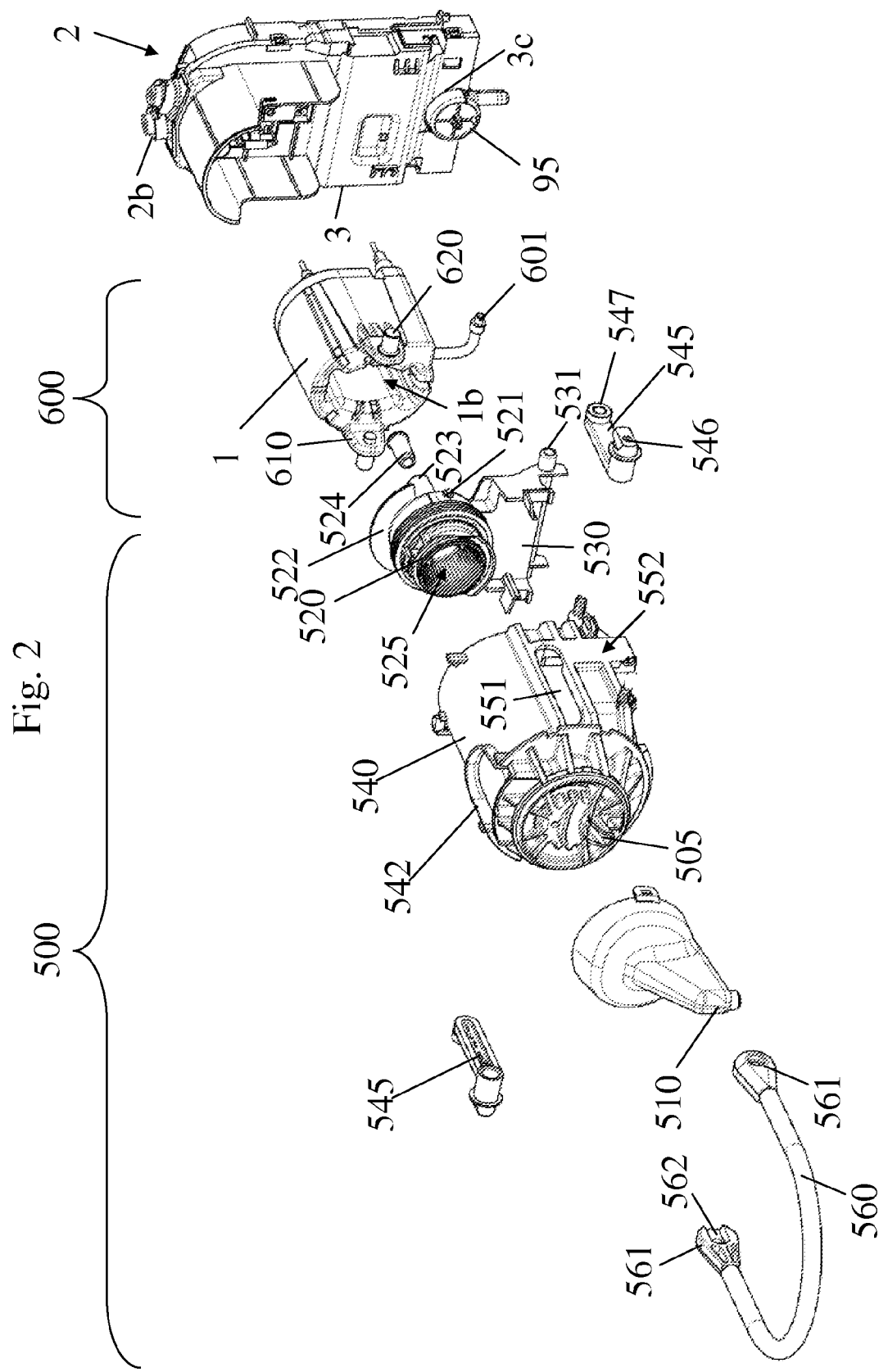

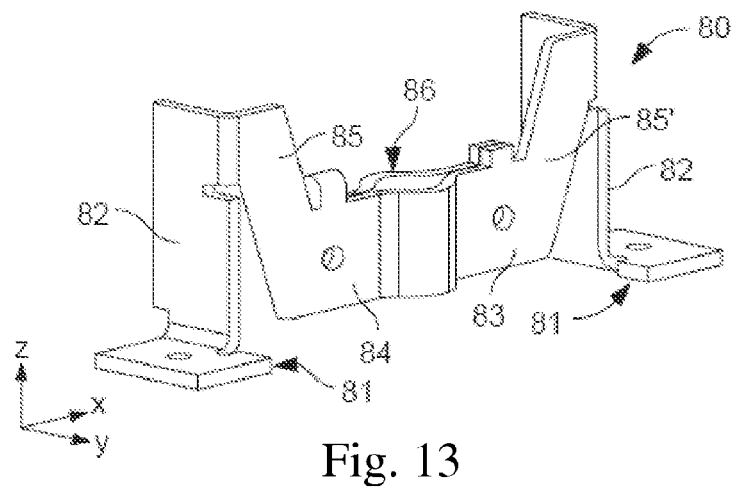
Fig. 13
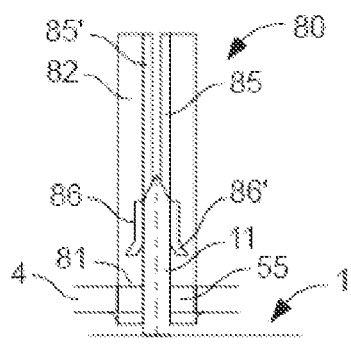 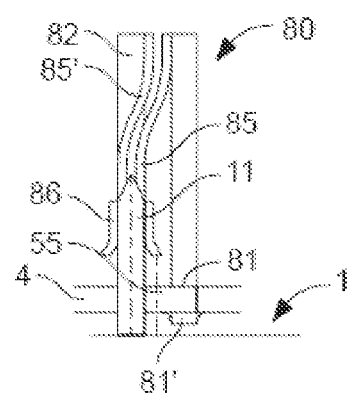
Fig. 14a        Fig. 14b
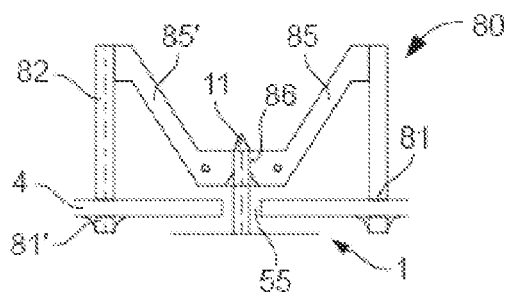 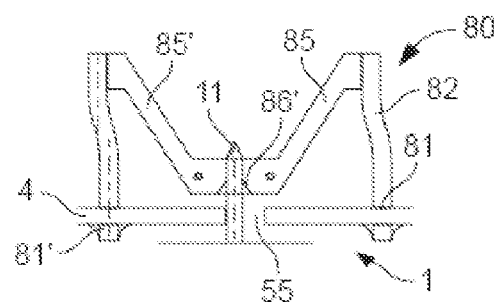
Fig. 15a        Fig. 15b

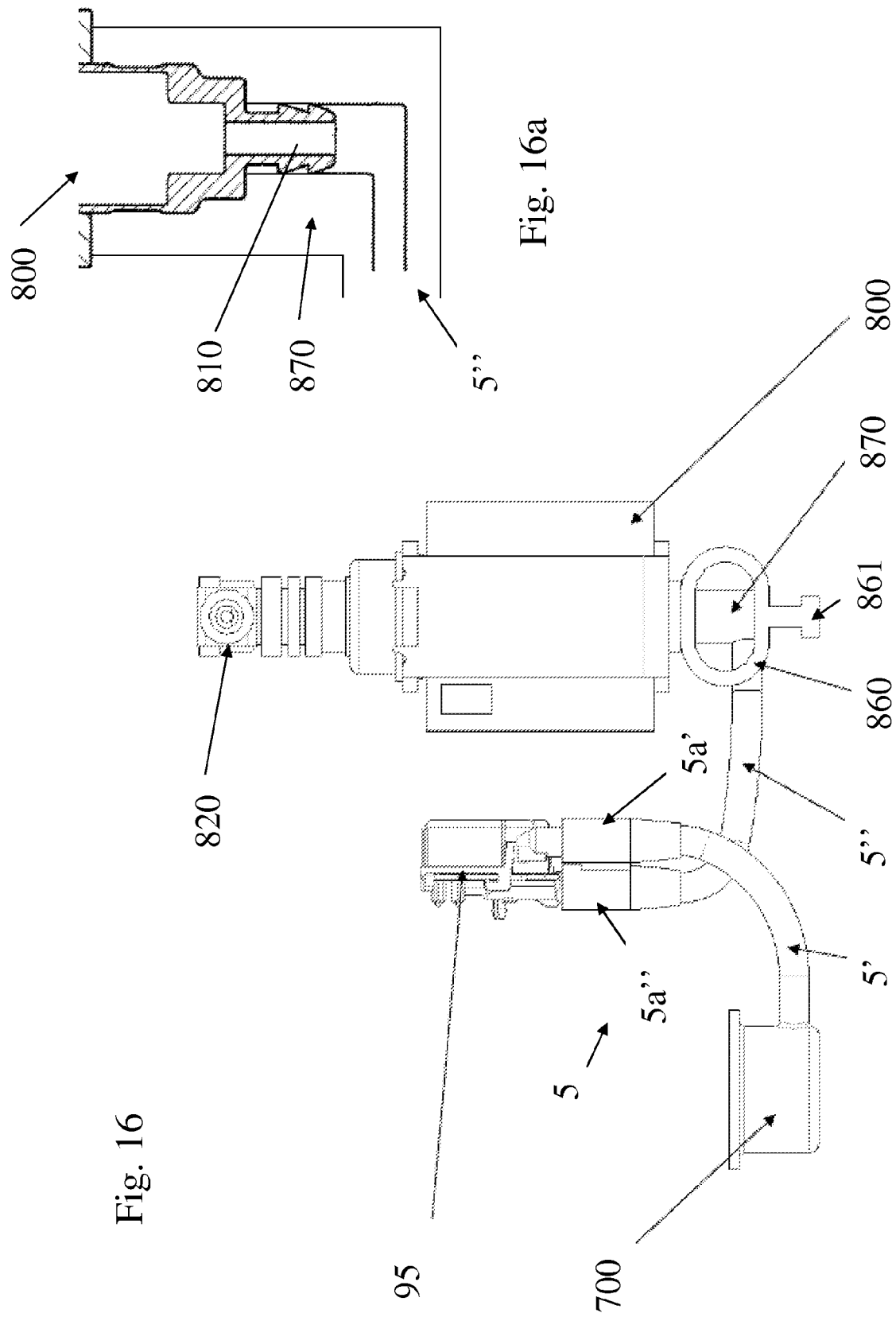

MODULAR ASSEMBLY OF A BEVERAGE PREPARATION MACHINE

This application is a 371 filing of International Patent Application PCT/EP2009/053368 filed Mar. 23, 2009, which is a continuation-in-part of each of International application nos. PCT/EP2008/060463 filed Aug. 8, 2008, PCT/EP2008/063092 filed Sep. 30, 2008, and PCT/EP2008/063128 filed Oct. 1, 2008.

FIELD OF THE INVENTION

The present invention concerns a manufacturing process for assembling a beverage preparation machine and a machine made of parts suitable to be assembled by such a manufacturing process.

For the purpose of the present description, a "beverage" is meant to include any liquid food, such as tea, coffee, hot or cold chocolate, milk, soup, baby food, etc. . . . .

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir via different silicone hoses, which are joined using clamping collars. Suitable pumps for beverage machines are for instance disclosed in U.S. Pat. Nos. 2,715,868, 5,392,694, 5,992,298 and 6,554,588.

EP 1 646 305 discloses a beverage preparation machine with a heating device that heats circulating water which is then supplied to the inlet of a brewing unit. The brewing unit is arranged to pass heated water to a capsule containing a beverage ingredient for its brewing. The brewing unit has a chamber delimited by a first part and a second part movable relative to the first part and a guide for positioning a capsule in an intermediate position between the first and second parts before moving the first and second parts together from an open to a closed configuration of the brewing unit.

In-line heaters for heating circulating liquid, in particular water, are also well known and are for example disclosed in CH 593 044, DE 103 22 034, DE 197 32 414, DE 197 37 694, EP 0 485 211, EP 1 646 305, FR 2 799 630, U.S. Pat. No. 4,242,568, U.S. Pat. No. 4,595,131, U.S. Pat. No. 5,019,690, U.S. Pat. No. 5,392,694, U.S. Pat. No. 5,943,472, U.S. Pat. No. 6,393,967, U.S. Pat. No. 6,889,598, U.S. Pat. No. 7,286,752, WO 01/54551 and WO 2004/006742.

More particularly, CH 593 044 and U.S. Pat. No. 4,242,568 disclose a coffee machine with an inline thermoblock heater having a metal mass with a resistive heating cable cast in the mass and with a duct for the circulation of water to be heated.

EP 0 485 211 discloses a heater for a water heater, shower, washing machine, dishwasher or kettle. The heater includes a vessel for heating liquid, and an electric heating element which is arranged to heat a portion of the vessel. The heating element incorporates a thick-film resistive heating circuit with a thermal fuse included in the thick-film. The document further discloses a triac-type power regulator mounted directly on the heating element that acts as a heat sinker for this triac. Also disclosed is the presence of a thermistor, a temperature sensor, formed on the thick film, a thermal fuse, a flow control valve to continuously adjust the flow rate through the heater, a flow control and a temperature control. These electrical components are connected to a control unit that can be remote or formed as part of the dielectric layer of the thick film at a location close to the inlet pipe where the heater's metal substrate is kept cool by incoming cold water. Similar ideas are disclosed in DE 103 22 034, DE 197 32 414 and DE 197 37 694. In-line tubular heaters for beverage preparation devices are disclosed in WO 01/54551, WO 2004/006742 and U.S. Pat. No. 7,286,752.

U.S. Pat. No. 6,889,598 discloses a beverage device containing a liquid and having an operating apparatus for heating, cooling, agitating, whipping, pumping or frothing the liquid or grinding an ingredient, the operating apparatus being powered via an electronic switch such as a triac that is cooled by being in heat passing relationship with the liquid so as to evacuate the heat produced by the switch to the liquid, in particular via the bottom of a liquid heating tank made of steel or aluminium, and optionally with a radiator.

Moreover, U.S. Pat. No. 5,019,690 discloses a boiling water dispenser that has a resistive heater powered via a triac switch connected via cables to a control module and mounted on the bottom of the dispenser's water reservoir to evacuate heat generated at the triac switch via the water.

U.S. Pat. No. 4,595,131 discloses a beverage preparation machine with a water heating reservoir that is electrically connected to a printed circuit board (PCB) via a series of cables leading to a thermostatically controlled heater and a thermistor probe in the reservoir. EP 1 610 596 discloses a heat evacuation system for a PCB that includes layers of thermally highly conductive material extending to a thermally conductive bar located at and along an edge of the PCB for dissipation of heat generated by the PCB.

FR 2 799 630 discloses an espresso machine having a cold water reservoir connected to a brewing unit via a pump and a thermoblock. The thermoblock includes a temperature sensor and an electric heater. The temperature sensor and the heater are connected to a PCB with a controller, electric power being passed to the heater via a triac located on the PCB and controlled by the controller.

U.S. Pat. No. 5,943,472 discloses a water circulation system between a water reservoir and a hot water or vapor distribution chamber of an espresso machine. The circulation system includes a valve, metallic heating tube and pump that are connected together and to the reservoir via different silicone hoses, which are joined using clamping collars.

A drawback in the prior art systems resides in their manufacturing complexity that requires significant manual intervention and results in increased costs. Since the proposed systems comprise a large number of stand alone parts, they requires a large number of assembly steps to fabricate and service the device. The assembly of silicon hoses and clamps, as well as free flexible, non-resilient electric cables and wires also require human intervention during assembly of the machine. As a result, the manufacture and service of such devices are complex and costly. Moreover, such prior art assembled machines lack integration and result in rather voluminous constructions.

SUMMARY OF THE INVENTION

A preferred object of the present invention is to simplify and improve the incorporation of the constitutive components of a liquid food or beverage preparation machine to facilitate and permit an increased automation of the assembly of the machine, reduce the manufacturing operations and costs, and increase the reliability of the machine and reduce its overall size.

This object is in particular achieved by providing a process for manufacturing a beverage preparation machine comprising the steps of:

provide a group of components a) to f) that include:
- a) a brewing unit for receiving an ingredient of this beverage, in particular a pre-portioned ingredient supplied within a capsule or a pod, and for guiding an incoming flow of liquid, such as water, through said ingredient to a beverage outlet;
- b) an in-line heater, such as a thermoblock, for heating this flow of liquid to be supplied to the brewing unit;
- c) a pump for pumping this liquid through the in-line heater;
- d) one or more fluid connecting members for guiding this liquid from a source of liquid, such as a tank of liquid, to the beverage outlet;
- e) an electric control unit, in particular comprising a printed circuit board (PCB), for receiving instructions from a user via an interface and for controlling the in-line heater and the pump; and
- f) one or more electric sensors for sensing at least one operational characteristic selected from characteristics of the brewing unit, the in-line heater, the pump, a liquid reservoir, an ingredient collector, a flow of this liquid, a pressure of this liquid and a temperature of this liquid, and for communicating such characteristic(s) to the control unit;

connecting components a) to f) for assembling this beverage machine.

The heater may be a thermoblock or an on demand heater (ODH), for instance an ODH type disclosed in EP 1 253 844, EP 1 380 243 and EP 1 809 151.

Thermoblocks are typically in-line heaters through which a liquid is circulated for heating. They comprise a heating chamber, such as one or more ducts, in particular made of steel, extending through a (massive) mass of metal, e.g. made of aluminium, iron and/or another metal or an alloy, that has a high thermal capacity for accumulating heat energy and a high thermal conductivity for the transfer the required amount of the accumulated heat to liquid circulating therethrough whenever needed. Instead of a distinct duct, the thermoblock's duct may by a through passage that is machined or otherwise formed in the duct's body, e.g. formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. Thermoblocks usually include one or more resistive heating elements, for instance discrete or integrated resistors, that convert electrical energy into heating energy. Such resistive heating elements are typically in or on the thermoblock's mass at a distance of more than 1 mm, in particular 2 to 50 mm or 5 to 30 mm, from the duct. The heat is supplied to the thermoblock's mass and via the mass to the circulating liquid. The heating elements may be cast or housed into the metal mass or fixed against the surface of the metal mass. The duct(s) may have a helicoidal or another arrangement along the thermoblock to maximise its/their length and heat transfer through the block. An example of such a heater is disclosed in greater details in PCT/EP08/063128.

The heater, in particular a thermoblock or an ODH, has a heating chamber in the metal mass that is usually elongated, e.g. forms a duct, along a direction of flow of liquid through the mass. The heating chamber may comprise an upper flow portion followed by a down-coming flow portion, for example portions of a generally helical duct which extend helically along a horizontal or non-vertical inclined axis. Such upper flow and down-coming flow portions may have a narrowed cross-section for promoting an increased velocity of liquid therealong to inhibit an accumulation of bubbles in such an upper flow portion by pushing them down the down-coming flow portion by the flow of liquid with increased velocity. In this configuration, the elongated chamber is arranged so that the size of its cross-section changes along the chamber, to increase the flow velocity in areas, usually upper areas, which might otherwise serve to capture bubbles, in particular vapour bubbles. The increased liquid velocity in these areas "washes" the bubbles down and away from these areas with the fast flow of liquid in these areas. To avoid overheating in such areas with reduced cross-section, the heating power may be reduced on the corresponding parts of the heater, for instance, by adjusting the resistive means on these parts. Examples of such heaters and ducts are disclosed in PCT/EP08/063092.

According to the invention, the step of connecting components a) to f) comprises pre-assembling at least two or three modules. Each module is fully automatically assembled from at least two components of the above components a) to f). The components of the fully automatically preassembled modules are so configured to be automatically seizable, orientable, positionable and fully connectable to each other in one or more automatic assembly steps, in particular by one or more assembly devices such as robots and/or automates, typically robots and automates that have two to six or three to five degrees of freedom.

By providing such components for a fully or essentially automatic assembly, assembly is substantially simplified and manual human intervention is no more required to assemble these components. This reduces the assembly costs and the reliability of the machine and reduces the risks or failures and problems due to human assembly errors since the assembly steps are simpler and may be essentially or fully automated.

This means that the components that are automatically assembled together should be provided with spatial reference portions that can be oriented and seized by an automatic assembly device, e.g. via a vibrating bowl or other similar apparatus of the assembly device, or should be supplied in pre-oriented and ordered manner, for example in a storage band or in a ordered supply cartridge, the latter comprising a spatial reference portion for the automatic assembly device.

The components of a fully automatically preassembled module may have inter-connectable rigid connecting parts that are automatically orientable and positionable and connectable during the automatic assembly step(s). Providing components with rigid parts that may serve as spatial references permits the automatic handling and assembly by the automatic assembly device. The assembly cinematic may in particular be programmed starting from such rigid portions that serve as references.

The components of a fully automatically preassembled module have inter-connectable connecting parts that are automatically connectable during the automatic assembly step(s) and that are selected from snap connectors, clipping connectors, clamping connectors, plug and socket connectors, bayonet connectors and screw connectors.

One of such modules can be a down-flow module that comprises the in-line heater and the brewing unit, the in-line heater and the brewing unit being optionally inter-connected by a bayonet connector arrangement or another connection arrangement.

Typically, the heater, e.g. thermoblock, has a metal mass' inlet, outlet and heating chamber that form together a rigid passage, in particular a rigid free-flow passage, for guiding the liquid circulating through the mass where it is heated.

The heater itself, e.g. thermoblock, may hold an upstream part of the brewing unit, the upstream part being formed by or rigidly anchored in the metal mass so that the rigid passage, in particular the rigid free-flow passage, of the metal mass extends into the brewing chamber.

Furthermore, the brewing unit usually includes a downstream part with a beverage outlet and cooperating with an upstream part with the inlet of the brewing unit to form the brewing chamber. The brewing unit's downstream part and the upstream part may be movable apart and movable together for the supply into the brewing chamber and the evacuation from the brewing chamber of a beverage ingredient. For instance, the upstream part and the metal mass are fixed, the downstream part being movable to and from the upstream part. Alternatively, the upstream part and the metal mass can be movable en bloc to and from the downstream part, the downstream part being fixed or movable in said machine. Such a brewing unit is for example disclosed in PCT/EP08/060463.

One of these modules may be a control module comprising the electric control unit and the electric sensor(s) for sensing the operational characteristic(s), the electric sensors having rigid connectors, in particular rigid connection pins cooperating with corresponding sockets, automatically connectable onto the electric control unit, the rigid connectors extending from the electric sensors to the control unit. Rigidly mounting the body of such sensors directly onto the PCB instead of remote connection, in particular via flexible non-resilient cables or wires, allows full automatic assembly thereof and reduces the risks of failures due to connection weaknesses. It follows that the location of sensing the operational characteristics of the machine should be close to the control unit. The internal arrangement of the machine, e.g. the fluid circuit, the heater, the pump, etc. . . . should hence be configured accordingly with their sensed locations in the vicinity of the control unit. Examples of such control units are disclosed in PCT/EP08/063128.

Hence, to reduce the number of assembly operations, in particular human interventions during the manufacturing process, the number of flexible non-resilient, deformable, electric cable connections are reduced. In particular, the electric components can be rigidly connected to control unit, in particular a PCB thereof, for instance via rigid connector pins or blades or rigid plug and socket members. Possibly, the electric components are present in the form of integrated components on a PCB that can be mechanically secured to the heater, e.g. thermoblock, so as to bring these electric components into contact with the heater's metal mass. In such a way, the electric components, in particular those which come into contact with the liquid circulation system such as the heating resistor(s), can be mounted automatically on the PCB, and then the PCB with its electric components is assembled (for instance clipped or glued) automatically onto the liquid circulation system without largely avoiding flexible non-resilient, deformable electric connectors (e.g. cables or wires) between the PCB and the liquid circulation system. It is also possible to assemble by welding the electric components to the PCB. Moreover, it is possible to provide some of these electric components as integrated components in the PCB, and applied directly against the surface of the heater's metal mass.

One of these sensors may be part of a fuse device. Such a device may have an actuator which comprises a thermo-mechanical component that is in thermal communication with the heater and that mechanically actuates the user switch to open the electric supply circuit when the heater exceeds the temperature limit. The thermo mechanical component comprises in particular a shape memory element or a bimetal element. The fuse device can include a safety electric temperature sensor in thermal communication with the heater and an electromechanical actuator that actuates the user switch to open the electric supply circuit when the safety sensor is exposed to a temperature generated by the heater which exceeds the temperature limit. At least part of the fuse device, in particular the actuator, electromechanical or thermo-mechanical actuator, the user switch and/or, when present, the safety sensor, may be rigidly connected to the control unit's PCB, optionally on a part that is electrically insulated from an ordinary control unit of the machine, e.g. a unit for controlling the usual operations of the machine such as beverage or liquid food dispensing, self-cleaning, user-interface, etc. . . . . . Hence, assembly and integration and safety of the fuse device into the liquid food and beverage machine is improved. Examples of such a fuse device are disclosed in PCT/EP08/063128.

In one embodiment, such an electric component is secured in a cavity of the heater's metal mass. Optionally, the component is secured in the cavity by means of a biased spring element in the cavity or the cavity forms a socket for a plug comprising the component or vice versa. Electric components may also be glued into or onto the metal mass, or attached by any other suitable means together with the metal mass, e.g. screwing, force fitting, etc. . . . .

Such electric component may include a power component, such as a resistor heater and/or a power switch, which is rigidly connected via a rigid electric power pin and a rigid power connector that has a socket for receiving the rigid electric pin. The rigid connector can be resilient, in particular made of one or more spring blades, to allow small displacements of the socket for self-positioning the socket around the pin and to secure electric contact between the pin and the connector.

In one embodiment, the control module has a housing for enclosing the control unit, the electric sensor(s) with the rigid connectors being allowed to extend from the control unit through the housing. The housing may be used to shield the control unit from liquids or vapours, dust or other residues present in the machine. Furthermore, the housing should be so configured to allow the passage of the sensors, e.g. by corresponding through openings or by providing a connection system, for rigid connection from the sensor to the control unit. The housing of the control unit may be thermally and electrically insulating, such as a plastic housing, and mechanically connected to the heater, in particular via snaps or screws.

The control unit typically comprises a PCB that may have a portion bearing a sensor of a flow meter, in particular a hall sensor. In such a case, the flow meter can be rigidly mounted onto this PCB portion so that said sensor is assembled with its PCB portion to the flow meter. The control unit may in particular include a housing with a through-opening through which the flow-meter extends from the PCB for connection within a fluid circuit extending outside the housing.

Alternatively, This PCB portion with the flow meter can be separated, such as torn off or broken away from the remaining PCB, and optionally the separated portion is mounted with the flow meter onto an outer face of the housing of the control unit, when present, or elsewhere. Upon separation of the PCB portion, the sensor may remain connected to the PCB via a flexible cable resilient or wire or another equivalent electric connection that is pre-mounted during the production of the PCB itself. Hence, such an electric connection of the sensors, which would require human intervention during the assembly process of the beverage machine, can be prepared during the automatic assembly of the PCB. When the PCB is produced, it is much easier to provide automatically a flexible non-resilient cable or wire connections between different pars of the PCB, in particular between a main portion of the PCB, e.g. bearing a controller, and a flow meter separable portion with the hall sensor. Handling automatically the PCB and separable or separated portions thereof during the assembly of the beverage machine is much simpler than flexible non-resilient wires or cables as such that have to be connected.

One of these modules can be an up-flow module that comprises the pump and a fluid connecting member for connecting the pump to the source of liquid. Optionally, the fluid connecting member has a flexible intermediate flow-through duct and a pair of connector ends that are in particular automatically orientable and positionable by means of a vibratory feeder such as a bowl feeder for subsequent connection to the pump and positioning for said source of liquid.

The manufacturing process may include the step of preassembling automatically the above mentioned a down-flow module and preassembling automatically the above mentioned control module, followed by automatically assembling the down-flow module and the control module, in particular by snap-fit and/or screwing.

The down-flow module typically includes a thermoblock with a metal mass that incorporates an inlet, an outlet and a heating chamber extending therebetween, the mass being arranged to accumulate heat and to supply heat to the liquid; and an arrangement to receive one or more electric components of the control unit that are rigidly secured onto or into the thermoblock and that are rigidly assembled or preassembled in the control unit for controlling such thermoblock. Such electric components may include sensors, thermal fuses and/or electric power components, in particular temperature sensors, flow meters, resistor heaters, ammeters and electric power regulators. All such electric components may be rigid, automatically spatially referenceable and automatically connectable onto or into the control unit.

Moreover, the manufacturing process may include the step of preassembling automatically the above mentioned down-flow module and preassembling automatically the above mentioned up-flow module, followed by automatically assembling the down-flow module and the up-flow module via a rigid fluid connecting member, in particular a fluid connecting member having a rigid duct and optionally end connectors with elastic sealing members.

The pump of the up-flow module may be connected to the in-line heater of the down-flow module by a rigid duct in particular a rigid tube member that can be handled and assembled automatically therebetween. The duct is preferably connected to the outlet of the pump by means of a connector. Such connector may comprise an elastic sealing member to resiliently connect the outlet of the pump and thus the pump to the rigid duct. Hence, the vibrations due to the operation of the pump are dampened by this elastic sealing member and inhibited from being transmitted to the heater. Accordingly, transmission of the vibrations of the pump to other parts within the housing of the device and in particular the transmission of vibrations to the duct or tube member and to other parts connected thereto can be largely prevented. Moreover, the elastic sealing member should be arranged to seal the connection between the liquid outlet of the pump and the duct such that no liquid may leave the connection. In addition, the elastic sealing member is designed to enable a pivoting movement of the duct with respect to the liquid outlet of the device to further dampen the transmission of vibrations of the pump. Examples of such pump connections are disclosed in EP 08157066.5.

The manufacturing process may include the step of preassembling automatically the above mentioned control module and preassembling automatically the above mentioned up-flow module, followed by automatically and/or manually assembling the down-flow module and the up-flow module via a fluid connecting member, in particular a fluid connecting member having a rigid duct and optionally end connectors with elastic sealing members.

As a pump of such a beverage machine tends to vibrate during use as mentioned above, it is preferably mounted with a dampener in the beverage machine to prevent or reduce the transmission of vibrations from the pump to the entire machine in particular to the user accessible parts of the machine. Examples of such pump dampeners are disclosed in EP 08157066.5.

Also, to inhibit transmission of such vibrations, the pump is preferably electrically connected to the control unit via an electric connection that does not transmit such vibrations or significantly reduces them. Hence, the pump may be connected to the control unit via flexible cables or wires. However, to permit automatic connection of the pump to the control unit, the same system technique may be used as for connecting the sensor of the flow meter to the PCB. Hence, the flexible cables or wires may be pre-mounted with both ends on the unit's PCB with one end on a detachable portion of the PCB, e.g. a portion provided with electric connecting stripes, forming a connector such as a plug for electrically connecting and powering the pump. Alternatively, the connection for the pump, e.g. flexible non-resilient wire or cable, may also be incorporated and guided to the pump in or against the pump dampener.

In one embodiment the manufacturing process includes the steps of:
  providing an open outer beverage housing, in particular an open two-shell housing;
  automatically inter-connecting the automatically preassembled modules;
  automatically mounting the inter-connected modules into the open outer beverage housing; and
  automatically closing the outer beverage housing containing the mounted modules, In a less preferred embodiment, it is also possible to connect a couple of modules manually or partly manually and partly automatically before closing the outer beverage housing, for instance as described in relation with the electric connection of the pump.

The invention also relates to a beverage preparation machine manufactured by the above described process. The components of such machine will have such a configuration and structure to be fit for automatic assembly, and will in particular avoid parts that are not spatially referenceable and/or orientable by a fully automatic assembly system for such beverage machines. In particular, these components will not include flexible non-resilient tubes, flexible non-resilient electric cables and wires that have at least one free floating end to be connected and/or that have no adequate reference structure that can be handled by an automatic assembly system, such as an automate or a robot.

Another aspect of the invention relates to a beverage preparation machine, in particular as described above. The machine comprises:
  a fluid circuit for guiding a liquid from a source of liquid to a beverage outlet;
  a control unit having a PCB; and a flow-meter located within the fluid circuit for measuring a flow therein, the flow-meter having a sensor, optionally a hall sensor, that is integral with a portion of the PCB, in particular a separable portion such as a portion that can be torn off or broken away from the PCB.

A further aspect of the invention relates to a beverage preparation machine, in particular as described above. This machine includes:

a brewing unit for receiving an ingredient of said beverage and for guiding an incoming flow of liquid, such as water, through said ingredient to a beverage outlet; and an in-line heater, such as a thermoblock, for heating said flow of liquid to be supplied to the brewing unit.

The brewing unit has an ingredient cage, in particular a cage for a capsule containing such ingredient, that is mechanically mounted onto and/or into a front part of the heater by connectors that are selected from snap connectors, clipping connectors, clamping connectors, plug and socket connector, bayonet connectors and screw connectors.

The capsule cage normally delimits a part of the machine's brewing chamber arranged to contain the beverage ingredient such as powder soup, ground coffee or tea optionally in a capsule or a pod. The brewing chamber may have an upstream part into which hot liquid is injected for brewing the food or beverage ingredient contained in the chamber and a downstream part leading into an outlet for guiding the liquid food or beverage produced by brewing. Suitable brewing chambers are for example disclosed in EP 1 299 022.

A yet further aspect of the invention relates to a beverage preparation machine, in particular of the above type, that comprises: a brewing unit having an ingredient cage for receiving an ingredient of such beverage and for guiding an incoming flow of liquid, such as water, through such ingredient along a generally horizontal direction towards to a beverage outlet; and an in-line heater, such as a thermoblock, having a mass with a duct for guiding and heating this flow of liquid to be supplied to the brewing unit. The ingredient cage is mechanically mounted onto and/or into a front part of the heater. The duct extends generally helicoidally in the heater's mass along a direction that is parallel, in particular coaxial, with the direction of flow of the liquid in the ingredient cage and leads into the ingredient cage along a direction that is coaxial with the direction of flow of the liquid in the cage.

Typically, the brewing unit has a fixed rear part including the ingredient cage and a front part movable thereto between an open position for inserting and/or removing said ingredient into and/or from the ingredient cage and a closed position for brewing such ingredient in the brewing unit, the front part moving in particular telescopically in and out from an outermost housing of such machine and/or coaxially with the direction of flow of the liquid in the cage.

The beverage machine may have a control unit with a PCB that extends adjacent the heater generally vertically, and/or generally perpendicularly to the direction of flow (527) of the liquid through the cage.

Generally speaking, by avoiding the use of non referenced or free-floating flexible non-resilient, deformable cables or wires or tubes, the number of operations during the assembly process of a liquid food and beverage preparation machine is reduced, in particular the number of human interventions is reduced. Hence, the manufacturing and assembly costs are correspondingly reduced as well as the risks of failures due to human error. By avoiding non-automatically referenceable flexible non-resilient and deformable components, automation of the assembly may be increased. Moreover, by providing non-destructively disconnectable electric, mechanic and fluid connections between the components of the beverage preparation machine as described above, servicing and repairing of the machine is greatly facilitated.

BRIEF DESCRIPTION OF THE DRAWINGS

The invention will now be described with reference to the schematic drawings, wherein:

FIG. 2 shows an exploded view of down-flow module and a control module;

FIG. 13 shows an electric power connection between a power component and the PCB;

FIGS. 14a and 14b as well as FIGS. 15a and 15b illustrate deflections according to first and second directions of the power connection shown in FIG. 13;

FIGS. 16 and 16a show a pre-assembled up-flow module for the manufacturing process of the invention.

DETAILED DESCRIPTION

As explained above, an aspect of the invention relates to a fully or largely automatic process for manufacturing a beverage preparation machine and to a machine configuration that permits such an automated assembly process.

FIGS. 1 to 18b illustrate different parts and assemblies of the beverage preparation machine during the manufacturing process, with a particular emphasis on features that make them suitable for automatic assembly. Typically, this type of beverage preparation machine is suitable to prepare coffee, tea and/or other hot beverages including soups and like food preparations. The pressure of the liquid circulated to the brewing chamber may for instance reach about 10 to 20 atm.

Figure 1:
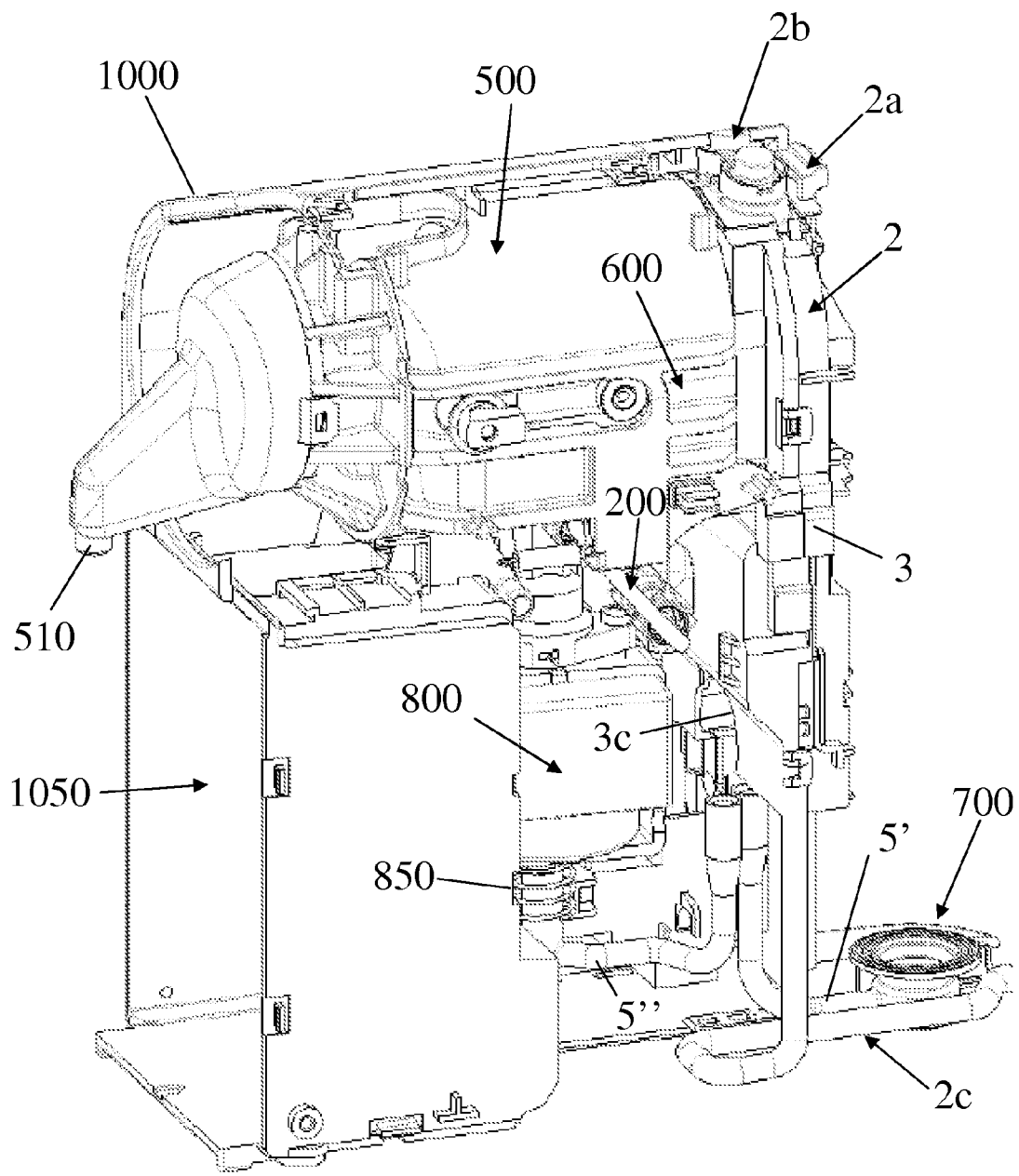
FIG. 1 shows the interior of a beverage machine during assembly according to the invention.

FIG. 1 generally provides an overall view of the internal components that may be found in a beverage preparation manufactured according to the invention. The components are shown mounted in a housing 1000 in a perspective view of the beverage preparation machine. Housing 1000 delimits a cavity 1050 for receiving a used capsule collector and a drip tray arrangement, for instance of the type disclosed in EP 1 867 260. The rear part of the machine is arranged to receive a water tank. An outside view with the water tank, capsule collector and drip tray collector of a machine of this kind is shown in PCT/EP09/053139.

For example, housing 1000 is formed of a two half-shells, e.g. a general clamshell, one of which serves as a receiving support for the assembly of the inner components and modules of the beverage machine into housing 1000. Hence, during assembly, all inner components and modules may be placed and connected within one half shell. Connection between the components and between the modules may be made before and/or upon assembly into the shell. When all inner components and modules are in place and connected in the half shell, housing 1000 is closed with the second half-shell, in particular by clipping the second half shell against the first one and/or by snap fit. The components and modules are preferably secured within housing 1000 by clipping, snap-fitting, clamping, squeezing or any other geometric immo-bilisation of the components and modules within a corresponding matching inner geometry of the housing 1000, in particular walls and partitions of the housing. Hence, no screws, rivets, glue, welding or other complicated connections for mechanical assembly and/or hardly disassemblable connections, are needed to secure the inner components and modules within housing 1000. This greatly simplifies the assembly as well as later possible maintenance and/or servicing of the beverage preparation machine.

The beverage preparation machine has a brewing unit 500 for receiving an ingredient of the beverage to be prepared, in particular a pre-portioned ingredient supplied within a capsule or a pod as known in the art. Brewing unit 500 is configured for guiding an incoming flow of liquid, such as water, through the ingredient, to a beverage outlet 510.

Furthermore, the beverage preparation machine has an in-line heater, such as a thermoblock 600 (shown in greater details in FIGS. 2 to 4), for heating the flow of liquid to be supplied to brewing unit 500. Liquid is driven from a liquid source in the form of a reservoir mounted on a fluid connector 700 through heater 600 via a pump 800 which are all interconnected. Hence, the beverage preparation machine has various connection members, in particular tubes or other members with ducts or channels 5',5",200,505, for guiding the liquid from reservoir 700 to beverage outlet 510.

For controlling the beverage preparation machine, the machine includes an electric control unit 2 shielded by a housing 3 that encloses a PCB 4, for receiving instructions from a user via an interface 2b and for controlling in-line heater 600 and pump 800. Housing has an opening 3c for accommodating a flow-meter 95 that is directly assembled onto PCB 4 and connected into fluid circuit 5 extending outside housing 3.

The beverage preparation machine also has one or more electric sensors 70,95 for sensing at least one operational characteristic selected from characteristics of brewing unit 500, in-line heater 600, liquid reservoir 700, an ingredient collector in cavity 1050, pump 800, a flow of the liquid, a pressure of the liquid and a temperature of the liquid, and for communicating such characteristics to control unit 2. Sensors are described in greater details in relation with FIGS. 10 to 12.

Also shown in FIG. 1, a master switch 2a connected to control unit 2 and an electric cord 2c for connection to the mains.

Figure 3B:
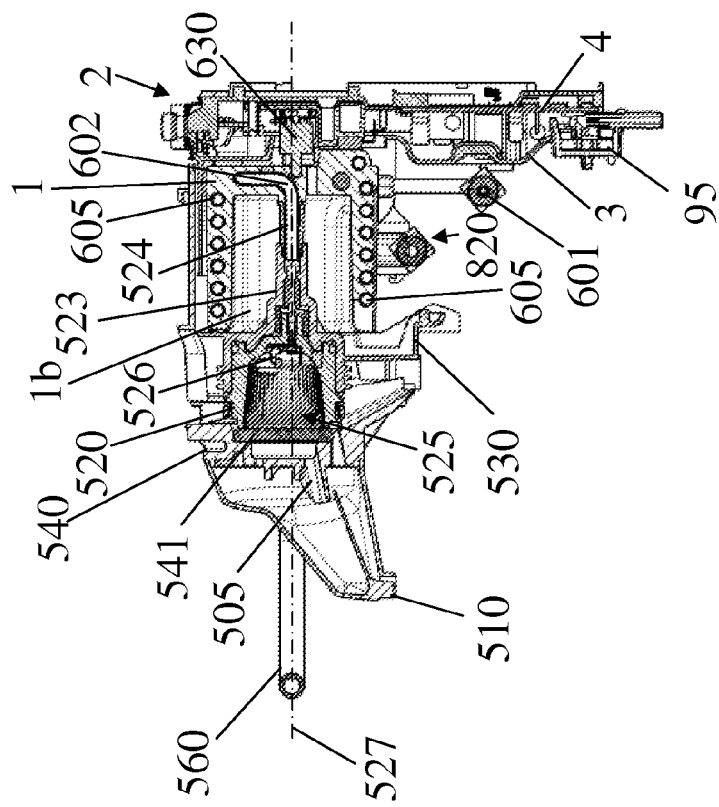
FIG. 3a illustrates a pre-assembled down-flow module for the manufacturing process of the invention, FIG. 3b showing this module in cross-section.
Figure 3A:
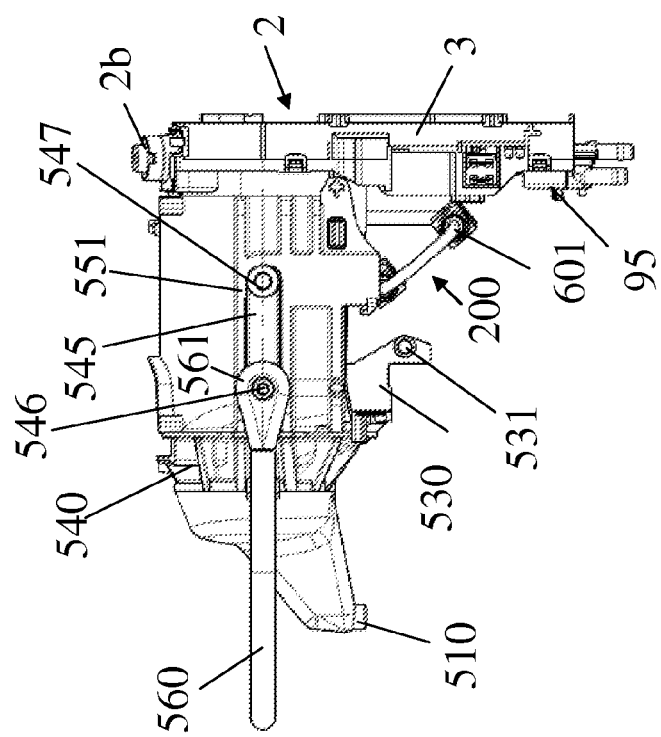

FIG. 2 illustrates a perspective view of a fully automatically preassembled module of a control unit 2 and various sensors 95, aligned with an exploded view of a module that may be fully automatically pre-assembled and that comprise a brewing unit 500 and a heater 600. The latter are also fully automatically assembled to each other as explained later. FIGS. 3a and 3b show these various elements upon assembly.

Brewing unit 500 has a fixed rear part that includes a capsule cage 520 delimiting a rear part of a brewing chamber 525 and has a movable front part 540 that delimits a front part of the brewing chamber. Front part 540 includes a pyramidal plate 541 for opening a capsule under the rising pressure in brewing chamber 525 as known in the art.

Heater 600 has a metal mass 1 with a peripheral part containing a helicoidal duct 605 between an inlet 601 and a central outlet 602 for circulating liquid. Inlet 601 is connected to an outlet 820 of pump 800 via an intermediate rigid tubular connection 200 that will be discussed in greater details below.

Heating duct 605 may comprise an upper flow portion followed by a down-coming flow portion, for example portions of a generally helical duct which extends along a horizontal or non-vertical inclined axis. Such upper flow and down-coming flow portions may have a narrowed cross-section for promoting an increased velocity of water therealong to inhibit an accumulation of bubbles in such upper flow portion by pushing them down the down-coming flow portion by the flow of water with increased velocity. In this configuration, the duct is arranged so that the size of its cross-section changes along the chamber, to increase the flow velocity in areas, usually upper areas, which might otherwise serve to capture bubbles, in particular vapour bubbles. The increased liquid velocity in these areas "washes" all possible bubbles away from these areas with the fast flow of liquid in these areas. To avoid overheating in such areas with reduced cross-section, the heating power may be reduced on the corresponding parts of the heater, for instance, by adjusting the resistive means on these parts. This principle is explained in greater details in PCT/EP08/063092.

In a variation, duct 605 has a reduced cross-section along its entire length to provide a sufficient velocity of the water flow for flushing possible vapour bubbles formed therein during heating.

Moreover, mass 1 has a central cavity 1b for housing a rear part of capsule cage 520 and a pair of integral arms 610 extending at the front of mass 1 and holding a pair of guide pins 620, each extending through an arm 610.

Capsule cage 520 is locked against mass 1 by a bayonet connection formed of a pair of lateral locking pins 521 on cage 520 that engage between inner extremities of pins 620 and the front of metal mass 1 upon a clock-wise pivoting movement of the rear part of cage 520 in cavity 1b. Cage 520 has an upper flange 522 that covers the upper front part of metal mass 1 upon assembly of capsule cage 520 in cavity 1b. Moreover, capsule cage 520 has an inlet 523 that is connected within cavity 1b to the outlet of metal mass 1 via a tubular rigid joining element 524. Rigid joining element 524 is associated with an O-ring seal that is compressed by the adjacent tubular elements 523,602 under the axial pressure of the bayonet closure so as to provide an impervious assembly that resists the liquid supplied under pressure by pump 800. Hence, rigid fluid passage formed by duct 605 in metal mass 1 extends into brewing chamber 525 via rigid element 524 and inlet 523.

Preassembled heater 600 and capsule cage 520 are secured into front part 540 of brewing unit 500 via two drive levers 545. Front part 540 has an open bottom (not shown) for allowing the passage of an upright foot 530 of capsule cage and has a pair of laterally elongated side windows 551 for the passage of a connector 546 at one end of lever 545. Inner side of connector 546 is pivotally mounted inside front part 540 on heater's pin 620 and fixedly assembled outside front part 540 in grooves 562 at extremities 561 of pivotable U-shaped handle 560. The other end of lever 545 has a wheel 547, e.g. including a ball bearing, that is arranged to move up and down in a corresponding upright groove 552 inside front part 540.

Hence, when extremities 561 and connector 546 are pivoted back and forth by an up and down action on handle 560, wheels 547 of levers 545 are moved up and down grooves 552 pulling connectors 546 back and forth along window 551, whereby rear part 520 and front part 540 of brewing unit 500 are moved together and apart. When front part 540 is spaced apart from rear part 520, a capsule may be inserted via upper opening 542 inbetween parts 520,540 and then enclosed in capsule chamber 525 when front part 540 is moved back against rear part 520. During these opening and closing operations of brewing unit 500, front part 540 will telescope in and out of outer housing 1000. Insertion and removal of capsules into capsule chamber 525 as well as construction details of a similar brewing unit are explained in greater details in co-pending application PCT/EP08/060463.

Moreover, foot 530 of rear part 520 has a pair of anchorage pins 531 that extend into housing 1000 of the beverage machine so as to anchor rear par 520 with heater 600 and allow front part 540 to move within housing 1000 under the action of lever 560.

It will be immediately apparent to the skilled person that the capsule cage 520, metal mass 1, front part 540, levers 545, handle 560, joining element 524 are all rigid and may be handled without difficulties by an automatic assembly system, e.g. a robot or an automate, for full automatic assembly thereof.

As illustrated in greater details in FIG. 3*b*, heater 600 with metal mass 1 is placed in direct fluid connection with capsule cage 520 via outlet 602 and intermediate tube 524. Capsule cage 520 has typically the form of a cup to enclose the capsule against front part 540 with pyramidal plate 541. Capsule cage 520 includes one or more capsule openers, such as piercing blades 526, for providing opening(s) for the injection of liquid into the ingredient within the capsule held in capsule cage 525. Hence, brewing unit 500 comprises capsule opening means, such as blades 526, located in brewing chamber 525 and arranged to open the capsule by penetration thereof in a generally horizontal direction 527, in particular by closing front part 540 along horizontal direction 527 and thereby urging the capsule against the capsule opening means in the closure movement. Brewing chamber 525 has a liquid circulation flow that extends generally horizontally along the brewing chamber from intermediate tube 524 to front part 540, in particular to its pyramidal plate 541.

Moreover, liquid circulates through metal mass 1 along a direction generally parallel to direction 527 of flow in brewing chamber 525, in particular coaxially thereto. More particularly, liquid is arranged to flow through heater 600 via a duct 605 that extends helicoidally along a generally horizontal direction 527 that is parallel, in particular coaxial, with the flow direction through the capsule cage. Moreover, this direction will be parallel to the telescoping movement of front part 540, as described above.

Hence, brewing chamber 525 and heater 600 with metal mass 1 are assembled, joined and aligned, geometrically, mechanically and fluidically, which permits a significant integration of the two components, saving of space, and assembly simplification.

Furthermore, also shown in FIG. 3*b*, control unit 2 has a PCB 4 that extends adjacent heater 600 generally vertically, and/or generally perpendicularly to the general direction of flow 527 of the liquid through capsule chamber 525 and metal mass 1. This configuration permits further integration of brewing unit 500, heater 600 and control unit 1 with PCB 4 in the beverage machine.

Furthermore, rear part of heater 600 is mounted onto control unit 2, in particular to its housing 3, by a connection element, in particular a screw-like element 630. As will be explained below, sensors and connectors extend from control unit 1 into heater 600 in a rigid manner so that the assembly of control unit 2 with heater 600 may be fully automatic.

Figure 4:
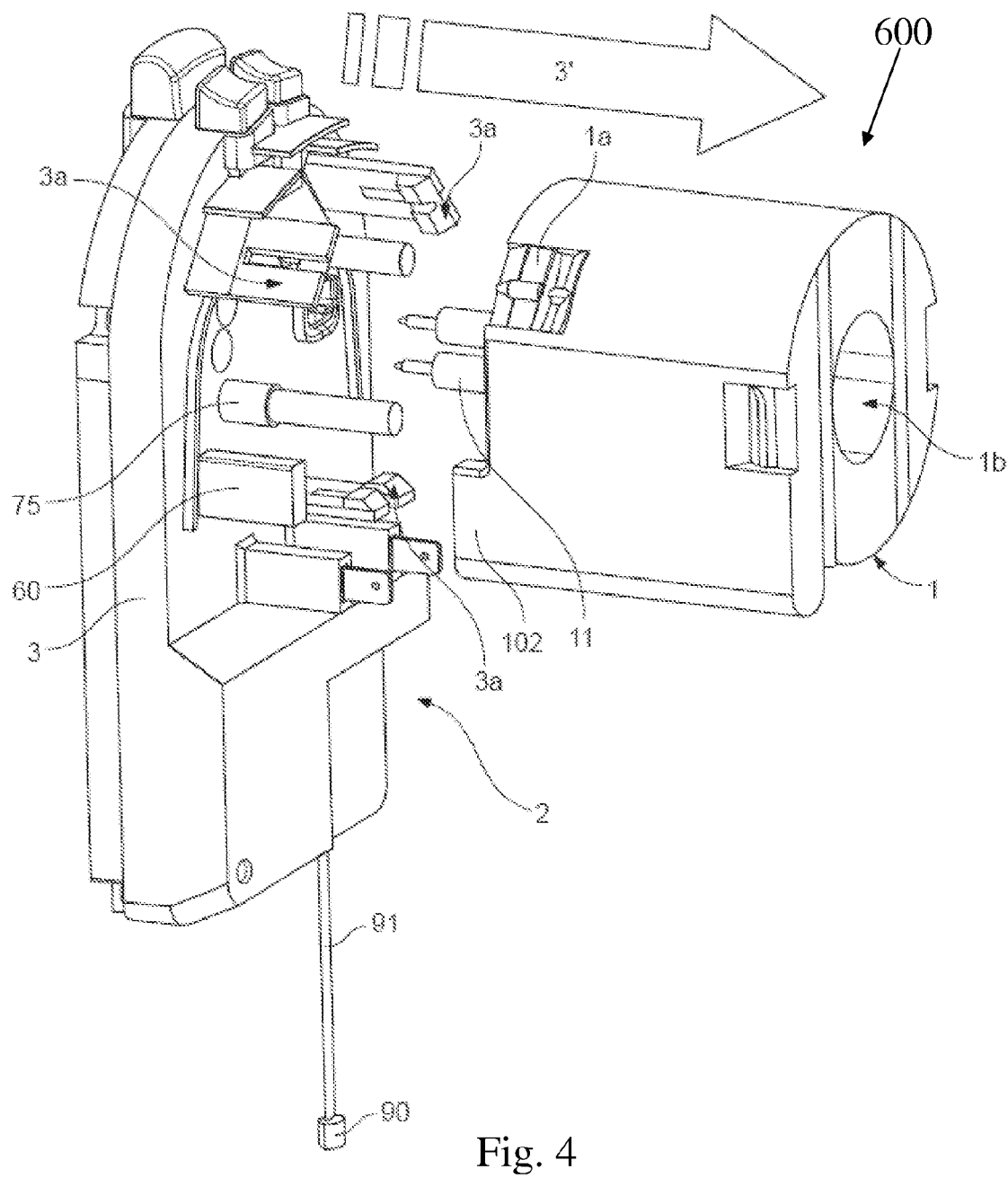
FIG. 4 illustrates the assembly between the control module and part of the down-flow module during the manufacturing process of the invention.
Figure 5:
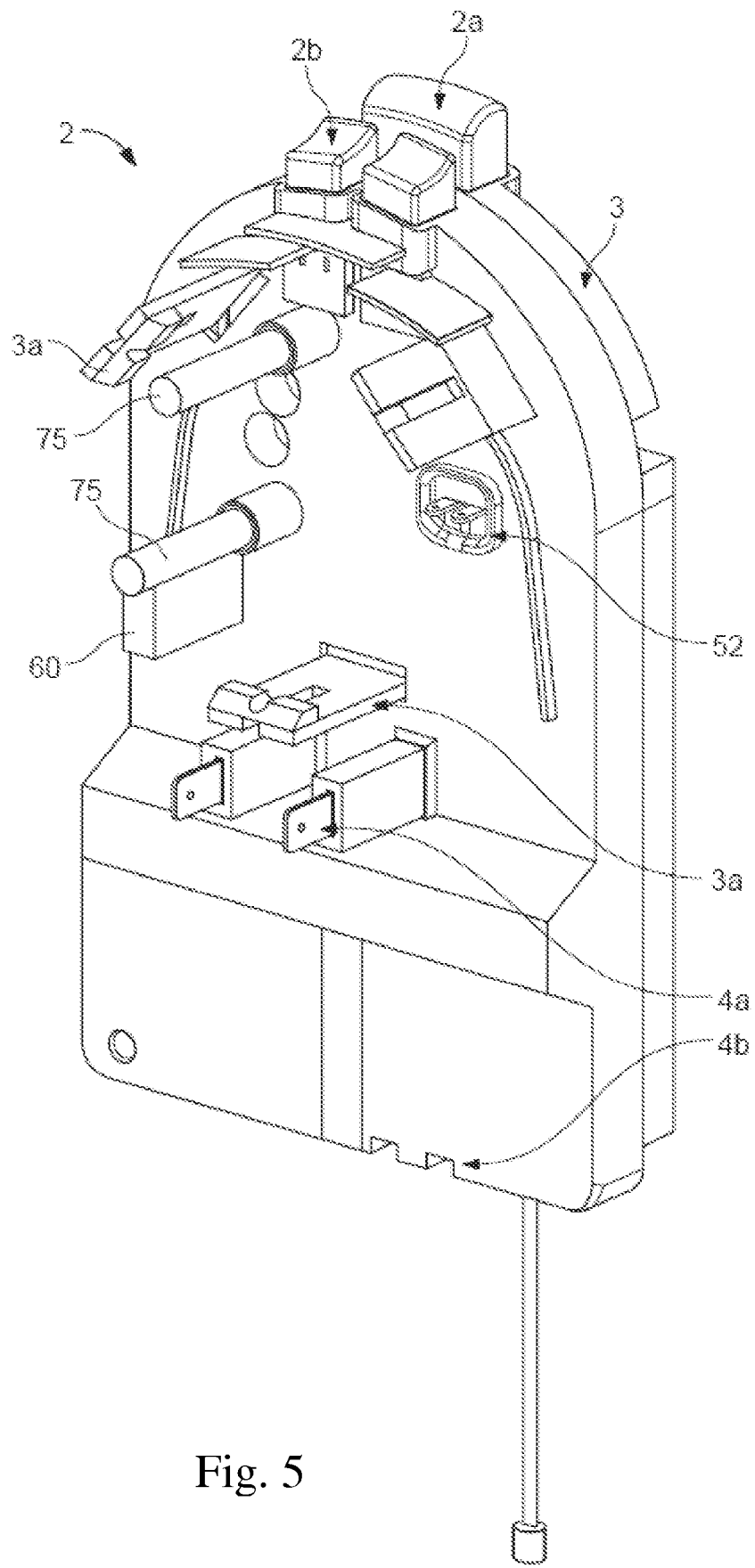
FIG. 5 shows this control module for the manufacturing process of the invention, an exploded view of this module being shown in FIG. 6.
Figure 6:
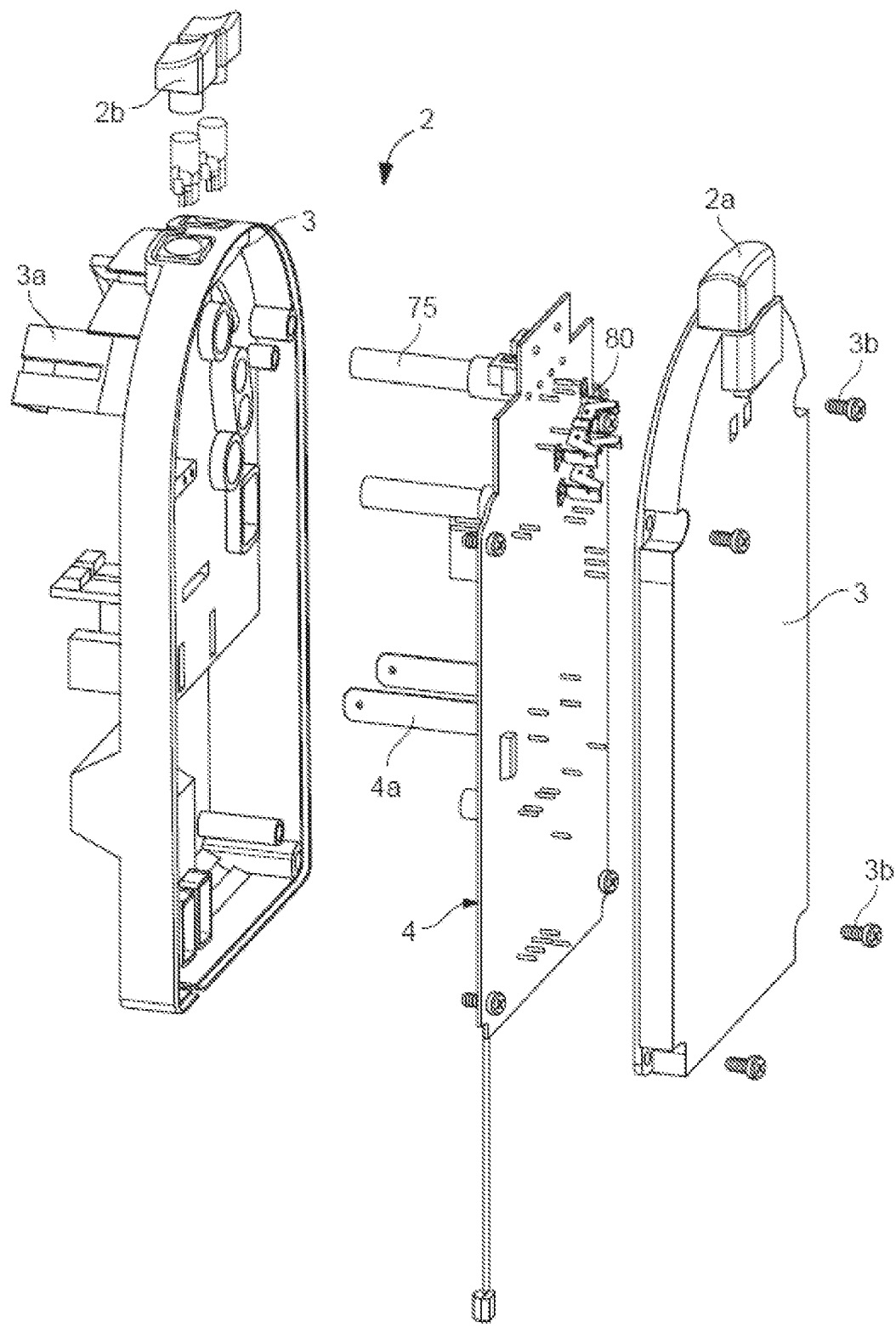

A slight variation of thermoblock 600 and control unit 2 is shown in FIGS. 4 to 6 in which the same numeric references generally designate the same or similar elements.

Control unit 2 is secured to a rear part of metal mass 1 of heater 600 via snaps 3*a* of housing 3 that cooperate with corresponding recesses 1*a* in the surface of metal mass 1 when housing 3 is assembled to metal mass 1 in the direction of arrow 3'.

The two part housing 3 of control unit 2 encloses PCB 4 on all sides, in particular in a substantially impervious manner so as to protect board 4 against liquid and vapours in the machine. The two parts of housing 3 may be assembled by screws 3*b* or any other appropriate assembly means, such as rivets, gluing, welding, etc. . . . . Control unit 2 is associated with a master switch 2*a* and two control switches 2*b* that are connected via housing 3 to PCB 4. It is of course possible to use more elaborated user interfaces including screens or touch screens. PCB 4 includes power connectors 80 for supplying electric heating power to metal mass 1 via power pins 11 extending through corresponding openings in housing 3, further electrical connectors 4*a* for one or more further electric devices in the liquid food or beverage preparation machine, such as a user interface, pump, fan, valve, liquid cooling element, etc. . . . as required, and a connector 4*b* to the mains for the central electric power supply. To avoid manual electric connection of pump 800 to control unit 2 via freefloating flexible electric cables or wires, it is possible to preassemble flexible non-resilient cables onto PCB 4 that includes a separable portion connected to the flexible cables or wires and that forms a plug or socket for pump 800. Hence, during the assembly, the separable portion of PCB 4 may be torn or broken away and connected to pump 800 automatically.

Thermoblock 600 includes electric components, namely a temperature sensor 70 connected to plug member 52, thermal fuses 75, a power switch in the form of a triac 60 in a cavity, the opening of which is formed between protruding walls 102, and a heating resistor (not shown) with connector pins 11, that are rigidly secured into metal mass 1 and rigidly connected to PCB 4, as will be explained in greater details below in connection with FIGS. 8 to 15*b*. Furthermore, PCB 4 is electrically connected via a rigid connector or cable 91 to a hall sensor 90 of a flow meter that is located in the water circuit of the beverage preparation machine, typically between pump 800 and a water or other liquid source such as a water or liquid reservoir, or between a pump and a heating device, or within a heater.

Hence, such electric components may be preassembled automatically either to the control unit or to the parts of the beverage preparation machine with which they are supposed to cooperate. Their rigidity as well as the rigidity of the control unit and of the receiving machine parts allow full automatic preassembly of these electric components.

Moreover, PCB 4 may carry a micro-controller or processor and possibly a quartz clock for controlling the intensity of current passed to resistive heating element based on the flow rate of the circulating liquid measured with the flow meter and the temperature of the heated water measured with the temperature sensor. To increase the accuracy of the temperature control, one or more temperature sensors may be incorporated into metal mass 1 and/or into brewing chamber 525 and/or upstream the metal mass 1 or at its water inlet 601 or outlet 602. The controller or processor also controls further functions of the beverage preparation machine, such as pump 800, a liquid level detector in a water supply reservoir (not shown), a valve (not shown), user interface 2*a*,2*b*, a power management arrangement (not shown), an automatic beverage ingredient supplier such as an integrated coffee grinder or an automatic supplier of ingredient capsules or pods (not shown), etc. . . . .

Figure 7:
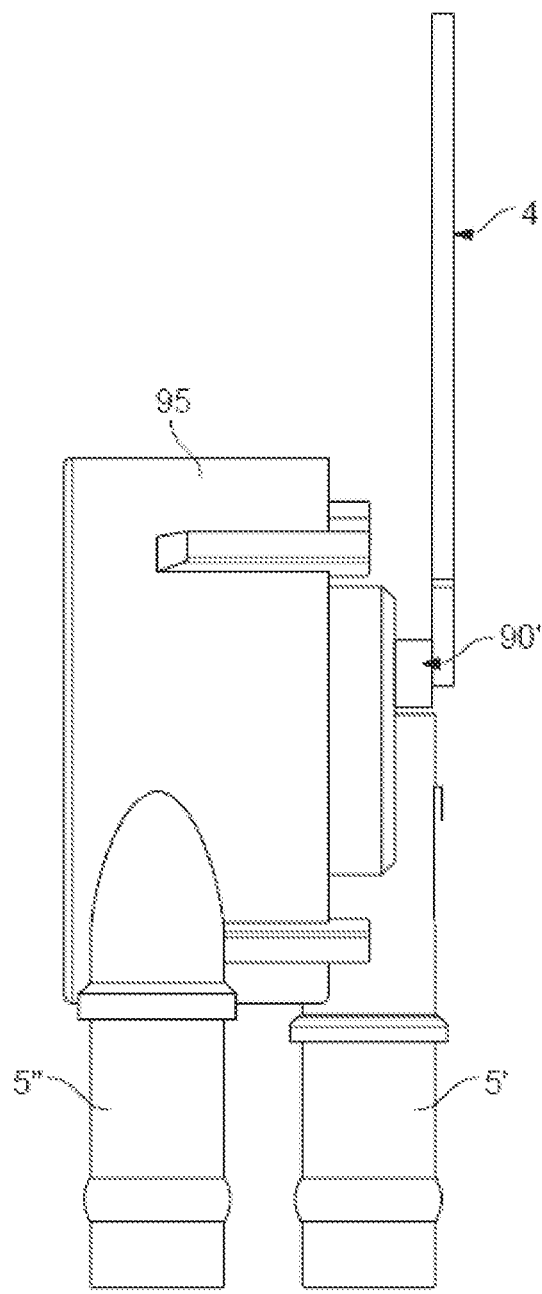
FIG. 7 shows a flow-meter mounted onto the PCB of such a control module.

FIG. 7 illustrates another embodiment according to the invention of a flow meter 95 for a liquid food or beverage preparation machine according to the invention. Flow meter 95 includes a hall sensor 90' that is incorporated onto PCB 4 as an integrated component of the PCB 4 or as a discrete component rigidly mounted or connected thereto, typically by welding. Flow meter 95 is also integrated in the up-stream water circulation circuit 5 and is connected to a water incoming pipe 5' and a water outgoing pipe 5" of circuit 5 and to PCB 4 via hall sensor 90'. Water pipes 5',5" may be flexible non-resilient, e.g. made of silicon, or rigid to facilitate automatic assembly. Flow meter 95 includes an internal magnetic helix or rotor (not shown) through which water is circulated. The water flow drives within flow meter 95 the magnetic helix or rotor in rotation at an angular speed that is proportional to the velocity of the flow of water thereby causing a corresponding rotation of the magnetic field generated by the magnetic helix or rotor, which is detected by hall sensor 90' and converted into a corresponding electric signal on PCB 4.

This configuration of flow meter 95 corresponds to the embodiment of the beverage preparation machine shown in FIGS. 1 to 3*b*. As shown, flow meter 95 is secured directly onto PCB 4 and extends through an opening at a bottom of housing 3 of control unit 2, so that inlet and outlet of flow meter 95 are located outside control unit 2 and connectable to the machine's fluid circuit, in this case between connector 700 for a liquid reservoir and pump 800.

By providing flow meter 95 with hall sensor 90' directly on PCB 4, the corresponding manufacturing steps of the liquid food or beverage preparation machine do not require human intervention. They involve less components, in particular no separate connector link, such as an electric cable, and thus reduce the production costs of the assembly of the beverage preparation machine as well as its reliability since fewer parts are involved and the human factor is also reduced. FIGS. 4 and 5 illustrate a less preferred configuration of a flow meter in which sensor 90 is mounted on a separable portion of PCB 4 and connected thereto via pre-connected cable 91. In this case, cable 91 is mounted onto PCB 4 at manufacturing thereof before the separable PCB portion of sensor 90 is separated from the remaining PCB 4.

During use, a liquid to be heated is circulated, for instance by using a pump, via flow meter 95 and then through inlet 601 of heater 600, through helicoidal heating duct 605 and through outlet 602 of heater 600 into brewing chamber 525 for brewing the ingredient contained therein. The controller on PCB 4 is arranged to control triac 60 for adjusting the heating current passed via power pins 11 to heating resistor in metal mass 1, based on measures of the liquid flow by means of flow-meter 95 and of the temperature of the heated liquid measured by means of temperature sensor 70 connected to plug member 52.

Figure 8:
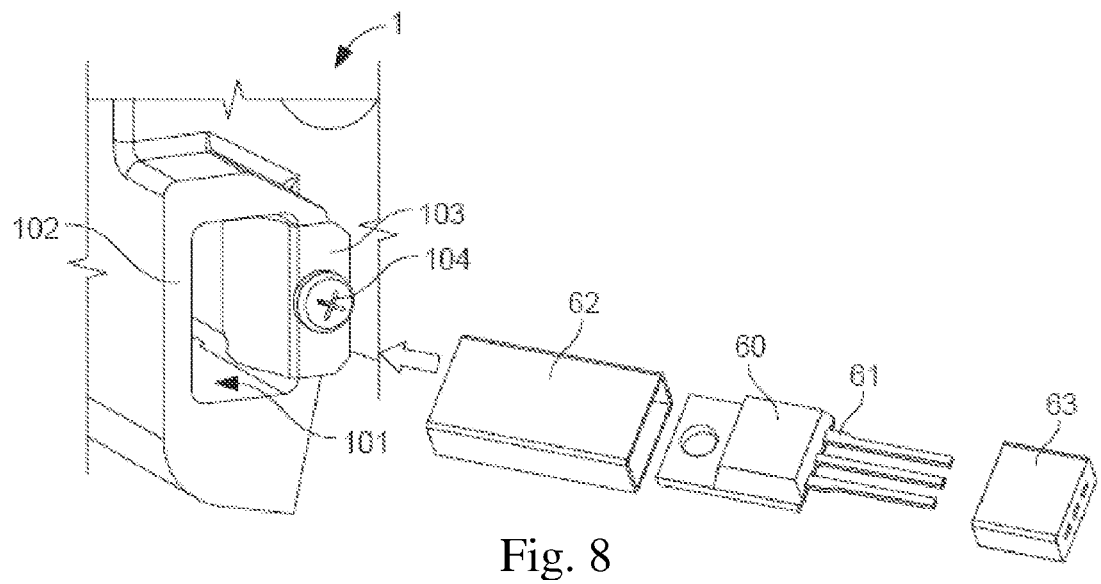
FIGS. 8 and 9 illustrate the assembly of an electronic component that is rigidly mounted on a PCB and in the heater.
Figure 9:
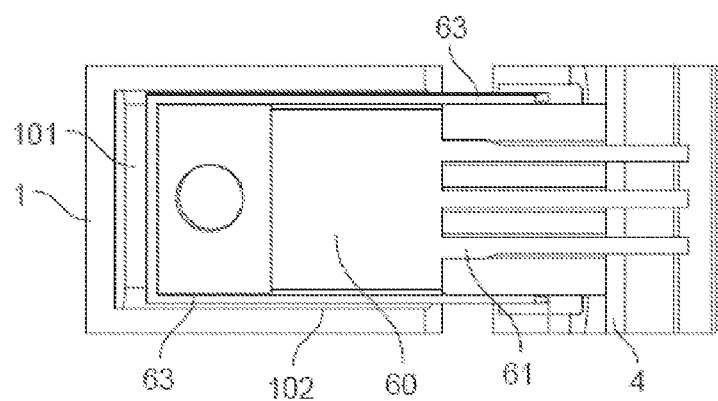

FIGS. 8 and 9, in which the same numeric references designate the same elements, illustrate in greater detail the rigid assembly of a discrete power component in the form of a triac 60 to metal mass 1 of heater 600 and to a PCB 4 according to the invention. Whereas FIG. 8 shows the assembly in an exploded perspective view, FIG. 9 discloses the assembly in cross-section.

Metal mass 1, a part of which is shown in FIGS. 8 and 9, has a recess 101 for receiving power component 60. Recess 101, the opening of which is formed between protruding walls 102, is associated with a spring element 103, for example in the shape of a spring leaf, assembled to metal mass 1, e.g. via a screw 104. Other spring and assembly systems may of course be used, for example, the spring leaf may be integral with metal mass 1 or welded thereto so as to reduce the number of parts. Spring element 103 urges power component 60 against walls 102 of recess 101 in metal mass 1 when component 60 is inserted into recess 101, to secure component 60 in mass 1 and provide an optimal contact between mass 1 and component 60.

Power component 60 has one or more rigid electric connector pins 61, for instance three pins for the triac shown in FIGS. 8 and 9, which are rigidly connected to PCB 4. Furthermore, power component 60 is covered with an optional cap 62, e.g. made of silicon, that may assist fixation of the power component 60 in recess 101, as well as an optional non conductive sleeve 63 around its connector pins 61 which spaces the main body of power component 60 from PCB 4 and protect pins 61 against the environment. Moreover, cap 62 and sleeve 63 provide an electric insulation around power component 60.

Hence, metal mass 1 serves as a heat sinker for power component 60 by evacuating, via mass 1 and optionally via the water circulating through mass 1, heat generated by the power component during use. For this purpose, mass 1 is configured and made of a metal, such as aluminium or steel, that allows optimal evacuation of heat from the power component along the heat evacuation path through mass 1.

Power component 60 may be a switch or regulating element, e.g. a triac as mentioned above, for adjusting the required electric power that is supplied to the resistive means, e.g. a heating resistor, for generating the desired heat in metal mass 1 in order to heat the circulating water to the appropriate temperature.

It will be apparent to the skilled person that the rigid component 60 and connection parts to heater 600 and PCB 4 make it fully suitable for full automatic assembly thereof.

Figure 10:
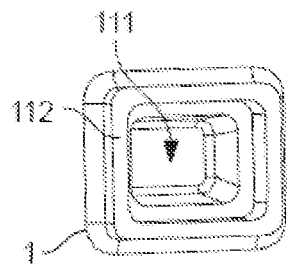
FIGS. 10 to 12 show the assembly of a sensor that is rigidly mounted onto the PCB and the heater.
Figure 11:
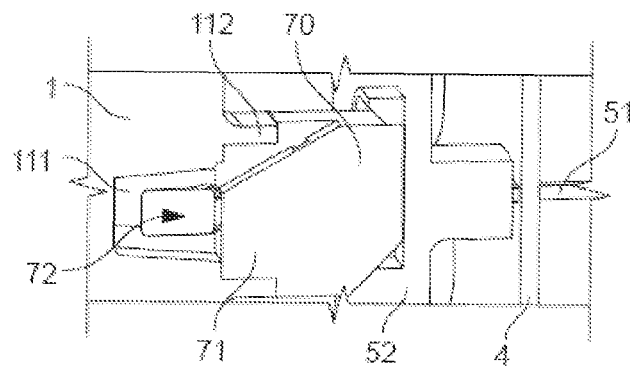
Figure 12:
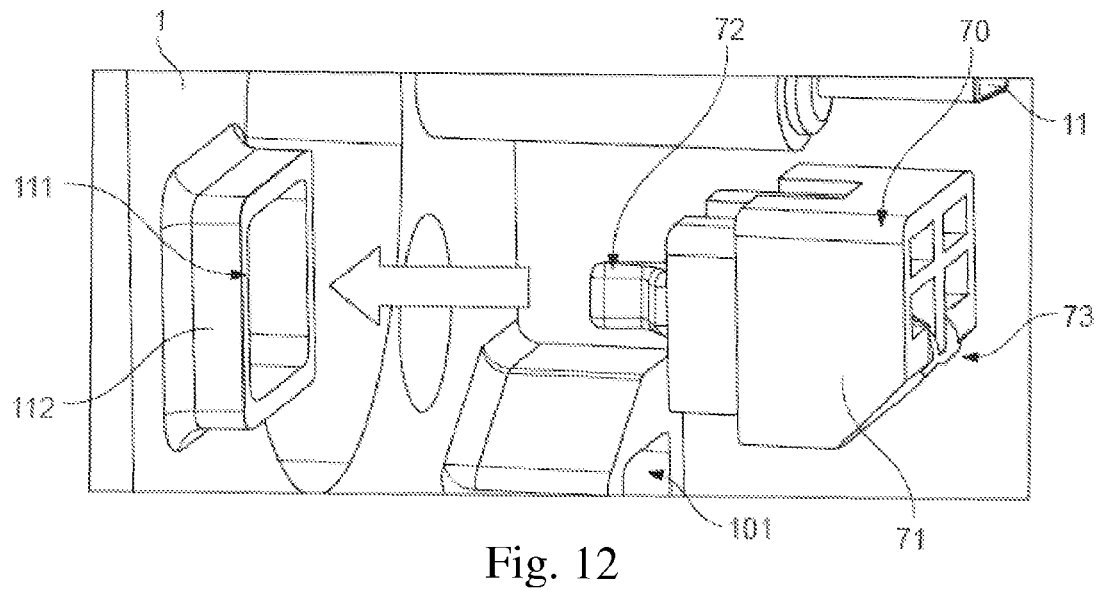

FIGS. 10 to 12, in which the same numeric references designate the same elements, illustrate the rigid assembly of a discrete electronic component 70 into metal mass 1 and to a PCB 4. This electronic component may be a sensor such as a temperature sensor, a thermal fuse or another similar component, such as an ammeter for providing a feedback of the current passed through the resistive heating means, e.g. heating resistor. For the purpose of illustration, a thermal sensor 70 for the control of heating electric current passed to the heating resistor via pins 11 and adjustment of the heat generated in metal mass 1 is disclosed. Thermal sensor 70 may for example be located at inlet 601 or outlet 602 of metal mass 1 or thereinbetween. Several thermal sensors may be used to allow a more precise control of the heating of the water passed via metal mass 1.

Metal mass 1 of heater 600, a part or which is shown in FIGS. 10 to 12, has a recess 111 for receiving the electronic component 70. Recess 111 is formed between protruding walls 112 and extends below the surface of metal mass 1.

Sensor 70 has a connector socket 71 through which a sensor element 72 is joined to electric flat connectors on the opposite side of socket 71. The sensor's connection pins 73 are brought into contact with flat connector pins 51, one of which is shown in FIG. 11, of PCB 4. Pins 51 extend through a plug member 52 of board 4 into socket 71 for contacting the corresponding connection pins 73 of sensor 70. When connector socket 71 is urged between walls 112 of body 1, sensor element 72 is located in recess 111 of metal mass 1. As shown in FIG. 5, plug member 52 extends through housing 3 via a corresponding opening. Alternatively, plug member 52 may be integral with housing 3 and electrically connected to PCB 4.

When sensor 70 is a temperature sensor, the electric characteristics of sensor element 72 will depend on the temperature in recess 111, which will be used for evaluating the temperature of metal mass 1 at this location and optionally also the temperature of water circulating in metal mass 1 in an indirect evaluation process.

Sensor element 72 may for instance be an NTC (negative temperature coefficient) resistor or a PTC (positive temperature coefficient) resistor.

Such a sensor configuration permits reliably measuring the temperature in the corresponding location of the heater, fast reaction (low inertia) and provides an excellent and reliable electric contact system.

Sensor 70 may be preassembled into socket 71, for instance made of thermoplastic material, and assembled into metal mass 1 and to PCB 4 in a fully automatic process. Sensor 70 may be glued into metal mass 1 using for example an epoxy compound. The preassembled sensor 70 may then be connected by pressing the socket's flat connectors 73 into connection slots of socket 71 in such a way as to be connected to sensor element 72. PCB 4 is then mounted with housing 3 onto socket 52 via plug 70 and connector pins 51. It is also possible to assemble sensor 71 first onto PCB 4 and then mount heater 600 against control unit 2 with sensor 71 at the right location on heater 600.

It follows that the assembly of thermoblock with metal mass 1 and PCB 4 does not require handling any flexible non-resilient part and thus the assembly can be carried out automatically without the need of any human intervention. Furthermore, the assembly of sensor 70 itself only requires low cost components. Hence, the assembly of sensor 70 on metal mass 1 and its connection to PCB 4 leads to significant cost savings.

FIG. 13 is a perspective view in an xyz orthogonal referential, as indicated by the corresponding arrows associated with FIGS. 13 to 15b, of a self-positioning rigid electric power connector 80 for connecting a heating resistor to a PCB 4 and for carrying electric heating current thereto or therefrom. FIGS. 14a and 14b on the one hand, and FIGS. 15a and 15b on the other hand, schematically show the self-positioning of power connector 80 in the y direction and the x direction, respectively.

Power connector 80 is typically metal-based, and may in particular contain steel, aluminium and/or copper alloys that provide sufficient electric conductivity, mechanical resistance and resilience.

Power connector 80 extends between a pair of flat feet 81 for connection to a PCB 4. Each foot 81 is connected to a bottom part of a flat generally upright spring member 82. The upper parts of the upright spring blades 82 are connected together via a transverse spring member 83 that comprises a flat central horizontal part 84 inbetween a pair of inclined intermediate parts 85,85'. Upright members 82, intermediate part 84 and inclined parts 85,85' of transverse member 83 are in a general M arrangement on the pair of feet 81. Transverse member 83 further includes a socket 86 with a through-passage for securing therethrough an electric connector pin 11 extending from metal mass 1.

In FIGS. 14a, 14b, 15a and 15b, in which the same numeric references designate the same elements, a power connector 80 is schematically shown assembled via a power pin 11 to a heating resistor (not shown) in metal mass 1. Power pin 11 extends upright from the surface of metal mass 1 and is secured in the through-passage of socket 86 of transverse member 83. To simplify the illustration, housing 3, as shown in FIGS. 4 to 6, extending between PCB 4 and metal mass 1, is not shown in FIGS. 14a to 15b.

Feet 81 of power connector 80 are electrically connected and secured onto PCB 4, for instance by rivets or welding 81' or any other suitable assembly means. Metal mass 1 faces PCB 4 so that power pin 11 extends through corresponding holes in housing 3 and through board 4 via a through-opening 55 in board 4 to the other side of board 4 and is then secured in through-passage 86 of power connector 80. Continuous electrical connection between power pin 11 and transverse member 83 may be achieved by force-fitting or welding pin 11 in through-passage 86.

Power connector 80 allows for small positioning displacements of through-passage 86 in the x direction and y direction, with reference to the xyz referential associated with FIGS. 13 to 15b. Different directions of displacements are provided by the different orientations, in particular perpendicular orientations, of the resilient spring blade members 82,83, which permit displacements along corresponding directions.

FIGS. 14a and 14b, on the one hand, and FIGS. 15a and 15b, on the other hand, show a displacement of the connector's socket 86 assembled to power pin 11 along the y direction and the x direction respectively. Displacement of socket 86 in the x and y directions is achieved by a small flexion of upright spring blades 82 and a small flexion of inclined intermediate parts 85,85', respectively.

FIGS. 14a and 15a show power pin 11 extending right through the middle of through-opening 55, and through the through-passage of socket 86 which all extend along substantially the same axis. In this configuration, power pin 11 is positioned in line with power connector 80 which is thus not subjected to any displacement flexion stress in its upright spring blades 82 and inclined intermediate parts 85,85'.

In contrast, FIGS. 14b and 15b show power pin 11 extending eccentrically through through-opening 55. Through-passage of socket 86 aligned to power pin 11 is equally eccentric with respect to through-opening 55. In this case, PCB 4 is not perfectly aligned with power pin 11 of the heater and power connector 80 self-adapts the position of its through-passage in socket 86 to match precisely the position of pin 11 by flexion of its upright spring blades 82 in the x direction, as shown in FIG. 15b, or by flexion of its transverse spring member 83 in the y direction, as shown in FIG. 14b. In order to facilitate insertion of power pin 11 into through-passage of socket 86, the lower part 86' of socket 86 has a generally funnel-like or frusto-conical shape that is arranged to receive a generally conical upper end of power pin 11.

The displacement of socket 86 to adapt to the position of power pin 11 may result from discrepancies, e.g. manufacturing tolerances or different temperature-related dilatation mechanisms, between the relative positioning of a pair of power connectors 80 on PCB 4 with respect to the relative positioning of a corresponding pair of power pins 11 on the metal mass. Furthermore, the relative position of other electrical components that are rigidly connected to the PCB and fixed parts of the beverage preparation machine, in particular the metal mass, for example temperature sensors and power regulator or switches, e.g. like the ones shown in FIGS. 5 to 9, may induce displacements at the level of the power connection.

During use, the passage of current from and back to PCB 4 via first power connector 80, first power pin 11, the heating resistor (not shown) in metal mass 1, the second power pin 11, the second power connector 80, is controlled by a power switch or regulator, e.g. a triac 60, for instance as illustrated in FIGS. 8 and 9.

FIGS. 14a and 14b also illustrate how an error of relative positioning of feet 81 and inclined parts 85,85' on PCB 4 is managed by power connector 80. As shown, feet 81 and thus inclined parts 85,85' are not perfectly aligned in the x direction but slightly off-set one to another. This off-set is however fully compensated by a corresponding resilient deflection of transverse member 83 without causing excessive stress in PCB 4 or in power connector 80. Likewise, if the spacing between the two anchorage locations on PCB 4 for anchoring feet 81 are greater or shorter than the spacing between feet 81 when the power connector is in a relaxed state, then a corresponding resilient deflection of members 82 can absorb such a spacing difference without excessive or detrimental stress in power connector 80 or PCB 4.

Tests have shown that in the case of an M-shaped power connector of the type shown in FIGS. 13 to 15b having an overall width and height above the feet of about 1.3 cm×1 cm, made of bent blade-type conductive metal spring portions that have a cross-section of about 3 mm×0.2 mm or 0.3 mm, the positioning offset that can be tolerated and compensated in all directions while maintaining good electrical and mechanical contacts for currents above 10 amps and temperatures around 80° C., may be in the range of 3 to 8%, in particular about 5%, or 0.25 to 0.7 mm, typically around 0.4 mm.

Hence, with such power connectors allowing small displacements in one or more directions of its connection part 86 relative to its base 81 for connection to a PCB 4, small position tolerances of preassembled or preformed heating element connectors can be compensated and still provide a good electrical contact performance under high current and elevated temperature conditions.

Therefore, with such a power connector 80 that self-positions its socket 86 on connector pins 11, it is possible to provide a cableless precise and continuous contact for high electrical currents, in particular between a resistive heating means on a heater and the power supply at PCB 4. The absence of flexible non-resilient power cables increases the integration, facilitates the manufacturing automation level of the device and reduces its production costs as well as its reliability by reducing the human factor.

FIGS. 16 and 16a, in which the same numeric references generally designate the same or similar elements, illustrate a pump 800 connected to connector 700 for a water reservoir. FIG. 16a is an enlarged view in cross-section of the upstream pump connector. Connector 700 for a water reservoir may be secured in housing 1000 of the beverage preparation machine.

Vibrating pumps are an example of pumps that are customarily used in beverage preparation machines. Vibrating pumps provide a reliable form of pressure to the circulated liquid. In particular, pump 800 drives water from low pressure system to a higher pressure needed, e.g. in a coffee machine for preparing espresso coffee. To minimise transfer of vibrations of pump 800 to other parts of the beverage preparation machine, pump 800 may be mounted on a spring 850, as indicated in FIG. 1, or on a deformable resilient ring 860 having a foot 861, as shown in FIG. 16, secured to bottom of housing 1000. Examples of pump dampening arrangements are disclosed in EP 08157066.5.

As can be seen in FIG. 16, a low pressure system 5 makes the link between the water tank connector 700, flow meter 95 and pump connector 870 for pump 800.

Both the low pressure system and pump support 860 are made of rubber. The integration of the pump support 860 and the connectors 700,870 for the low pressure system reduces the number of parts and simplifies the assembly and therefore reduces costs.

FIG. 16 illustrates the water tank connector 700 connected to a tubing 5',5" of the low pressure water circulation system. This tubing connects a water reservoir (not shown) to pump 800. Downstream from connector 700, flow meter 95 is located between tubular sections 5',5". Flow meter 95 is connected, at an intermediate portion of tubing 5',5" inbetween an intermediate tubing outlet 5a' and inlet 5a" that are integral with tubing 5',5".

In fact, tubing 5',5", tubing's tank connector 700, intermediate outlet 5a' and inlet 5a" of tubing 5',5", pump support 860 and pump connector 870 form a single component which makes it suitable to be handled automatically by providing reference parts. Indeed, despite a possible use of flexible non-resilient tubular sections 5',5", e.g. made of silicon, the end portions 700, 870 and intermediate portions 5a',5a" may be oriented and spatially referenced automatically, e.g. by using a vibrating bowl, for full automatic handling and assembly thereof within the beverage preparation machine.

The integration of these low-pressure tubing parts and pump support member results in the reduction in the number of stand alone parts of the beverage preparation machine and therefore, this leads to the reduction of the overall number of parts. The consequence is the improvement of assembly for the beverage preparation device and a cost reduction as well as an automatic assembly process that does not require human intervention.

In addition, since the number of connectors is decreased, a better compression of the system is achieved, by eliminating the weak spots where leaks can occur. By integrating the pump support 860, the space occupied by the pump body is decreased for the same pump performance. The disposition of the flow meter integrated between the water tank connector and the pump is optional. For instance, the flow meter may be provided downstream from the pump before or after an in-line water heater.

Pump 800 can be a vibrating pump known in the field of beverage preparation machines. Thereby, a piston is movably mounted within a pump chamber (not shown). Preferably, a spring may be provided within the pump chamber in order to exert a force on the piston. Moreover, an electromagnetic solenoid can provided in the periphery of the pump chamber in order to drive the piston. Hence, an axial reciprocating movement of the piston within the pump chamber is enabled due to activation by means of the solenoid. The pump chamber is connected to a liquid inlet 810 and a liquid outlet 820 of pump 800. The piston normally includes a bore which can be selectively closed by a valve in order to pump liquid from liquid inlet 810 to liquid outlet 820 of pump 800 during the reciprocating movement of the piston. Inlet 810 has an outer serrated connection portion that is force-fitted into the outlet of connector 870, e.g. made of silicon, so as to provide a water-tight sealed connection between pump 800 and fluid circuit 5.

In a variation, pump support 860 includes electric flexible connection means, such as wires. Thereby, the electric connection means within support 860 may be linked to a rigid electric connection linking control unit 2 and pump support 860. Such a rigid connection may can handled and assembled fully automatically.

Figure 17A:
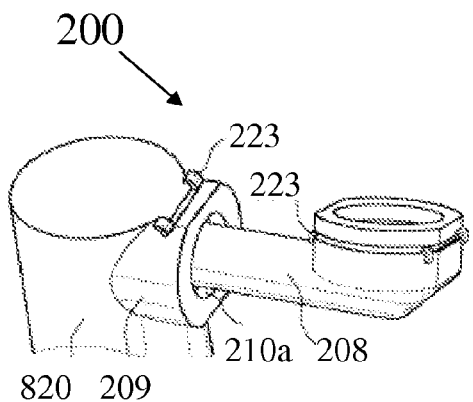
FIGS. 17a to 18b show the connection between a pre-assembled up-flow module and a pre-assembled down-flow module.
Figure 17B:
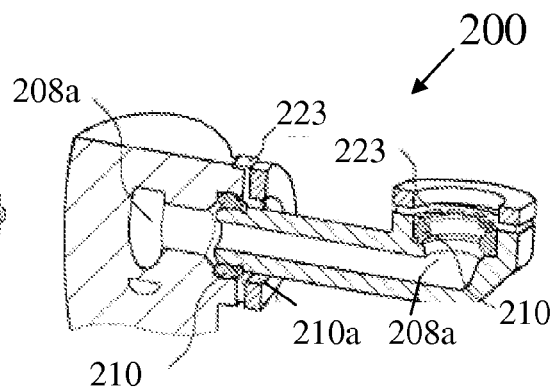

FIGS. 17a and 17b show a perspective view of a rigid fluid connection assembly 200. Assembly 200 includes a connector 209 for connecting the rigid duct of pump outlet 820 with rigid tube members 208 towards heater 600. On the pump side of the tubular connection, connector 209 is preferably formed as an integral part of outlet 820. A similar rigid tubular system may also be provided upstream the pump (not shown).

Each tube member 208 comprises a bore 208a for guiding liquid within tube members 208. Bore 208a of each tube member 208 is connected via a circular support 210a to a corresponding tubular portion.

Circular support 210a has preferably a circular opening of a diameter d2 which is wider than an outer diameter d1 of tube member 208. Circular support 210a is thus designed for receiving a tube member 208.

Figure 18A:
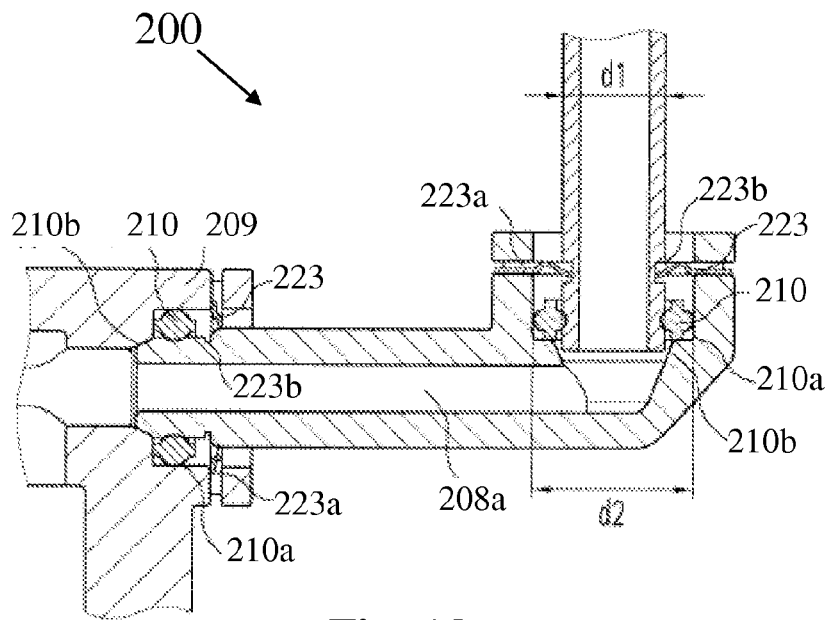

As can be seen in FIG. 18a, connector 209 further comprises an elastic sealing member 210 which is mounted at circular support 210a for tube member 208. Elastic member 210 is preferably an O-ring or the like, suitable for sealing the connector 209.

Moreover, connector 209 comprises fastening means 223 which interact with tube member 208 to be connected to connector 209. Fastening means 223 is preferably a locking ring or clip interacting with a preferably circular groove 223b provided at a lateral surface of tube member 208 to be connected to the connector 209. Thereby, locking ring 223 is held within a recess 223a provided at the connector 209. Hence, due to fastening means 223, a stable connection between two tubular members can be achieved as illustrated.

The connector further comprises a chamfered portion 210b which connects bore 208a and circular support 210a.

When a tube member 208 is connected to connector 209, tube member 208 is supported within circular support 210a only by means of elastic sealing member 210 and fasting means 223. Thereby, chamfered portion 210b allows pivoting movements of tube member 208 with respect to connector 209.

Figure 18B:
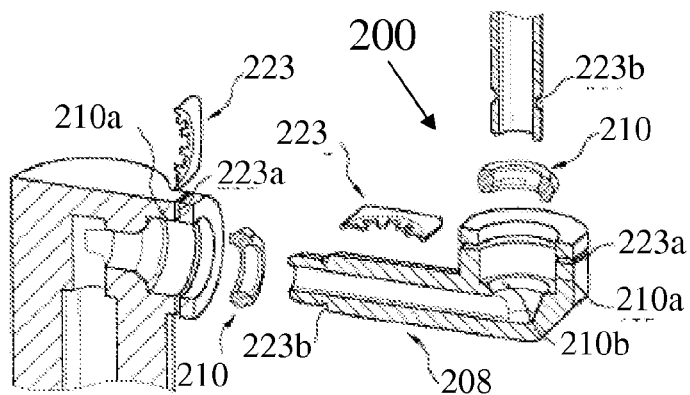

As shown in FIG. 18b, for the assembly of two tubular members, elastic sealing member 210 is introduced into the circular support 210a of connector 209. Then, tube member 208 is introduced into circular support 210a. The position of tube member 208 with respect to connector 209 is secured by fastening means 223 which are slid into dedicated recess 223a. Fasting means 223 and chamfered portion 210b of connector 209 are designed to enable a pivoting movement of tube member 208 within connector 209. Thereby, position of elastic sealing member 210 within connector 209 is secured by fastening means 223.

Hence, vibrations exerted, for instance by pump 800 in operation, may be absorbed at this connection without significant transmission through the fluid circuit. Moreover, due to elastic sealing member 210 arranged between the tubular members, inhibition of vibration transmission is even further enhanced.

Moreover, by providing the described arrangement, comprising a rigid tube member 208 instead of a flexible non-resilient tube member connected to vibrating pump 800, their assembly process of pump 800 and tube member 208 may be automated. Hence, human intervention during assembly process can be prevented and thus, the assembly costs of the device can be reduced. The same type of rigid connection may also be provided upstream pump 800, between pump 800 and connector 700.

To further inhibit vibration communication downstream the pump to the beverage preparation machine, in particular to heater 600, a similar connection is provided between tube 208 and inlet 601 of heater 600.

What is claimed is:

1. A process for manufacturing a beverage preparation machine which comprises:
   providing at least two pre-assembled modules with each module being fully automatically assembled from at least two components selected from a group of components a) to f), with the components comprising:
   a) a brewing unit for receiving a pre-portioned ingredient supplied within a capsule or a pod, and for guiding an incoming flow of liquid through the ingredient to a beverage outlet;
   b) an in-line heater comprising a thermoblock, for heating the flow of liquid to be supplied to the brewing unit;
   c) a pump for pumping the liquid through the in-line heater;
   d) one or more fluid connecting members for guiding the liquid from a source of liquid to the beverage outlet;
   e) an electric control unit comprising a printed circuit board, for receiving instructions from a user via an interface and for controlling the in-line heater and the pump; and
   f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit;
   pre-assembling at least two or three modules, wherein the modules are selected from a down-flow module comprising the in-line heater and the brewing unit, a control module comprising an electric control unit, one or more electric sensor(s) for sensing the operational characteristic(s) and rigid connectors that extend from the control unit through the housing, or an up-flow module comprising the pump and a fluid connecting member for connecting the pump to the source of liquid; and
   connecting components a) to f) of each module for assembling the beverage machine,
   wherein the components of the fully automatically preassembled modules are configured with spatial reference portions to be automatically seizable, orientable, positionable and fully connectable to each other in one or more automatic assembly steps, and
   wherein the components of each fully automatically pre-assembled module have inter-connectable rigid connecting parts that are automatically orientable and positionable and connectable during the automatic assembly step(s).

2. The process of claim 1, wherein the automatic assembly steps are conducted by one or more assembly devices that include a robot or automate, wherein the robot or automate has two to six degrees of freedom.

3. The process of claim 1, wherein one of the modules is a down-flow module comprising the in-line heater and the brewing unit and the in-line heater and the brewing unit are inter-connected by a bayonet connector.

4. The process of claim 1, wherein one of the modules is an up-flow module comprising the pump and a fluid connecting member for connecting the pump to the source of liquid, optionally with the fluid connecting member having a flexible intermediate flow-through duct and a pair of connector ends that are automatically orientable and positionable by means of a vibratory feeder for subsequent connection to the pump and positioning for the source of liquid.

5. A process for manufacturing a beverage preparation machine which comprises:
   providing at least two pre-assembled modules with each module being fully automatically assembled from at least two components selected from a group of components a) to f), with the components comprising:
   a) a brewing unit for receiving a pre-portioned ingredient supplied within a capsule or a pod, and for guiding an incoming flow of liquid through the ingredient to a beverage outlet;

b) an in-line heater comprising a thermoblock, for heating the flow of liquid to be supplied to the brewing unit;

c) a pump for pumping the liquid through the in-line heater;

d) one or more fluid connecting members for guiding the liquid from a source of liquid to the beverage outlet;

e) an electric control unit comprising a printed circuit board, for receiving instructions from a user via an interface and for controlling the in-line heater and the pump; and f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit;

pre-assembling at least two or three modules, wherein the modules are selected from a down-flow module comprising the in-line heater and the brewing unit, a control module comprising an electric control unit, one or more electric sensor(s) for sensing the operational characteristic(s) and rigid connectors that extend from the control unit through the housing, or an up-flow module comprising the pump and a fluid connecting member for connecting the pump to the source of liquid; and connecting components a) to f) of each module for assembling the beverage machine, wherein the components of the fully automatically preassembled modules are configured with spatial reference portions to be automatically seizable, orientable, positionable and fully connectable to each other in one or more automatic assembly steps, and wherein the components of a fully automatically preassembled module have inter-connectable connecting parts that are automatically connectable during the automatic assembly step(s) and that are selected from snap connectors, clipping connectors, clamping connectors, plug and socket connector, bayonet connectors and screw connectors.

6. A process for manufacturing a beverage preparation machine which comprises:

providing at least two pre-assembled modules with each module being fully automatically assembled from at least two components selected from a group of components a) to f), with the components comprising:

a) a brewing unit for receiving a pre-portioned ingredient supplied within a capsule or a pod, and for guiding an incoming flow of liquid through the ingredient to a beverage outlet;

b) an in-line heater comprising a thermoblock, for heating the flow of liquid to be supplied to the brewing unit;

c) a pump for pumping the liquid through the in-line heater;

d) one or more fluid connecting members for guiding the liquid from a source of liquid to the beverage outlet;

e) an electric control unit comprising a printed circuit board, for receiving instructions from a user via an interface and for controlling the in-line heater and the pump; and f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit;

connecting components a) to f) of each module for assembling the beverage machine, automatically preassembling a down-flow module comprising the in-line heater and the brewing unit; and automatically preassembling a control module, followed by automatically assembling the down-flow module and a control module comprising a housing for enclosing a printed circuit board, wherein the electric sensor(s) with the rigid connectors are allowed to extend from the control unit through the housing, wherein the components of the fully automatically preassembled modules are configured with spatial reference portions to be automatically seizable, orientable, positionable and fully connectable to each other in one or more automatic assembly steps.

7. A process for manufacturing a beverage preparation machine which comprises:

providing at least two pre-assembled modules with each module being fully automatically assembled from at least two components selected from a group of components a) to f), with the components comprising:

a) a brewing unit for receiving a pre-portioned ingredient supplied within a capsule or a pod, and for guiding an incoming flow of liquid through the ingredient to a beverage outlet;

b) an in-line heater comprising a thermoblock, for heating the flow of liquid to be supplied to the brewing unit;

c) a pump for pumping the liquid through the in-line heater;

d) one or more fluid connecting members for guiding the liquid from a source of liquid to the beverage outlet;

e) an electric control unit comprising a printed circuit board, for receiving instructions from a user via an interface and for controlling the in-line heater and the pump; and f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit;

connecting components a) to f) of each module for assembling the beverage machine;

automatically preassembling a down-flow module comprising the in-line heater and the brewing unit;

automatically preassembling an up-flow module comprising the pump and a fluid connecting member for connecting the pump to the source of liquid; and automatically assembling the down-flow module and the up-flow module via a rigid fluid connecting member, wherein the fluid connecting member has a rigid duct and end connectors with elastic sealing members, and wherein the components of the fully automatically preassembled modules are configured with spatial reference portions to be automatically seizable, orientable, positionable and fully connectable to each other in one or more automatic assembly steps.

8. A process for manufacturing a beverage preparation machine which comprises:

providing at least two pre-assembled modules with each module being fully automatically assembled from at least two components selected from a group of components a) to f), with the components comprising:
- a) a brewing unit for receiving a pre-portioned ingredient supplied within a capsule or a pod, and for guiding an incoming flow of liquid through the ingredient to a beverage outlet;
- b) an in-line heater comprising a thermoblock, for heating the flow of liquid to be supplied to the brewing unit;
- c) a pump for pumping the liquid through the in-line heater;
- d) one or more fluid connecting members for guiding the liquid from a source of liquid to the beverage outlet;
- e) an electric control unit comprising a printed circuit board, for receiving instructions from a user via an interface and for controlling the in-line heater and the pump; and
- f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit;

connecting components a) to f) of each module for assembling the beverage machine;

automatically preassembling a control module comprising the electric control unit and the electric sensor(s) for sensing the operational characteristic(s);

automatically preassembling an up-flow module comprising the pump and a fluid connecting member for connecting the pump to the source of liquid; and automatically or manually assembling the control module and the up-flow module via an electric connector or flow-meter, wherein the electric connector comprises a detachable portion of the control unit connected by a pre-assembled flexible electric connection to the control unit, and wherein the components of the fully automatically preassembled modules are configured with spatial reference portions to be automatically seizable, orientable, positionable and fully connectable to each other in one or more automatic assembly steps.

9. A process for manufacturing a beverage preparation machine which comprises:

providing at least two pre-assembled modules with each module being fully automatically assembled from at least two components selected from a group of components a) to f), with the components comprising:
- a) a brewing unit for receiving a pre-portioned ingredient supplied within a capsule or a pod, and for guiding an incoming flow of liquid through the ingredient to a beverage outlet;
- b) an in-line heater comprising a thermoblock, for heating the flow of liquid to be supplied to the brewing unit;
- c) a pump for pumping the liquid through the in-line heater;
- d) one or more fluid connecting members for guiding the liquid from a source of liquid to the beverage outlet;
- e) an electric control unit comprising a printed circuit board, for receiving instructions from a user via an interface and for controlling the in-line heater and the pump; and
- f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit;

connecting components a) to f) of each module for assembling the beverage machine;

automatically preassembling a control module comprising the electric control unit and the electric sensor(s) for sensing the operational characteristic(s);

automatically preassembling an up-flow module comprising the pump and a fluid connecting member for connecting the pump to the source of liquid; and automatically or manually assembling the control module and the up-flow module via an electric connector or flow-meter, wherein the electric connector comprises a detachable portion of the control unit connected by a pre-assembled flexible electric connection to the control unit, and wherein the components of the fully automatically preassembled modules are configured with spatial reference portions to be automatically seizable, orientable, positionable and fully connectable to each other in one or more automatic assembly steps, and wherein the flow-meter is rigidly mounted in the control unit or on a detachable portion of the control unit and is provided with a pre-assembled flexible connection to the control unit.

10. A process for manufacturing a beverage preparation machine which comprises:

providing at least two pre-assembled modules with each module being fully automatically assembled from at least two components selected from a group of components a) to f), with the components comprising:
- a) a brewing unit for receiving a pre-portioned ingredient supplied within a capsule or a pod, and for guiding an incoming flow of liquid through the ingredient to a beverage outlet;
- b) an in-line heater comprising a thermoblock, for heating the flow of liquid to be supplied to the brewing unit;
- c) a pump for pumping the liquid through the in-line heater;
- d) one or more fluid connecting members for guiding the liquid from a source of liquid to the beverage outlet;
- e) an electric control unit comprising a printed circuit board, for receiving instructions from a user via an interface and for controlling the in-line heater and the pump; and
- f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit;

connecting components a) to f) of each module for assembling the beverage machine;

providing an open outer single or double shell beverage housing;

automatically inter-connecting the at least two or three automatically preassembled modules;

automatically mounting the inter-connected modules into the open outer beverage housing; and automatically closing the outer beverage housing containing the mounted modules, and, optionally, further connecting two inter-connected modules manually before closing the outer beverage housing, wherein the components of the fully automatically preassembled modules are configured with spatial reference portions to be automatically seizable, orientable, positionable and fully connectable to each other in one or more automatic assembly steps.

11. A beverage preparation machine comprising:
at least two or three pre-assembled modules with each module at least two components selected from:
  a) a brewing unit for receiving a pre-portioned ingredient supplied within a capsule or a pod, and for guiding an incoming flow of liquid through the ingredient to a beverage outlet;
  b) an in-line heater comprising a thermoblock for heating the flow of liquid to be supplied to the brewing unit;
  c) a pump for pumping the liquid through the in-line heater;
  d) one or more fluid connecting members for guiding the liquid from a source of liquid to the beverage outlet;
  e) an electric control unit comprising a printed circuit board, for receiving instructions from a user via an interface and for controlling the in-line heater and the pump; and
  f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit; and
at least one inter-connectable connecting part per component selected from snap connectors, clipping connectors, clamping connectors, plug and socket connectors, bayonet connectors and screw connectors;
wherein the two or three modules are selected from a down-flow module comprising the in-line heater and the brewing unit, a control module comprising an electric control unit, one or more electric sensor(s) for sensing the operational characteristic(s) and rigid connectors that extend from the control unit through the housing, and an up-flow module comprising the pump and a fluid connecting member for connecting the pump to the source of liquid;
wherein the components of the modules are configured with spatial reference portions to be automatically seizable, orientable, positionable and fully connectable to each other by means of the inter-connectable connecting parts.

12. The beverage preparation machine of claim 11, further comprising:
a fluid circuit for guiding a liquid from a source of liquid to a beverage outlet;
wherein the printed circuit board of the control unit includes a flow-meter located within the fluid circuit for measuring a flow therein, the flow-meter having a hall sensor that is integral with a separable portion of the printed circuit board.

13. The beverage preparation machine of claim 11, wherein the brewing unit has an ingredient or capsule cage that is mechanically mounted adjacent to the in-line heater by snap connectors, clipping connectors, clamping connectors, bayonet connectors or screw connectors.

14. The beverage preparation machine of claim 13, wherein the brewing unit guides the incoming flow of liquid through the ingredient along a generally horizontal direction towards the beverage outlet; and the in-line heater has a mass with a duct for guiding and heating the flow of liquid to be supplied to the brewing unit, wherein the duct extends generally helicoidally in the mass along a direction that is coaxial with the direction of flow of the liquid in the ingredient cage and leads into the ingredient cage along a direction that is coaxial with the direction of flow of the liquid in the ingredient cage.

15. The beverage preparation machine of claim 14, wherein the brewing unit has a fixed rear part including the ingredient cage and a front part movable thereto between an open position for inserting or removing the ingredient into or from the ingredient cage, and a closed position for brewing the ingredient in the brewing unit, with the front part moving telescopically in and out from an outermost housing of such machine or coaxially with the direction of flow of the liquid in the ingredient cage.

16. The beverage preparation machine of claim 14, wherein the control unit extends adjacent the heater generally vertically or generally perpendicularly to the direction of flow of the liquid through the ingredient cage; and wherein the at least one inter-connectable connecting part per component is selected from snap connectors, clipping connectors, clamping connectors, plug and socket connectors, or bayonet connectors.

17. A process for manufacturing a beverage preparation machine which comprises:
providing a group of components a) to f), with the components comprising:
  a) a brewing unit for receiving a pre-portioned ingredient supplied within a capsule or a pod, and for guiding an incoming flow of liquid through the ingredient to a beverage outlet;
  b) an in-line heater comprising a thermoblock for heating the flow of liquid to be supplied to the brewing unit;
  c) a pump for pumping the liquid through the in-line heater;
  d) one or more fluid connecting members for guiding the liquid from a source of liquid to the beverage outlet;
  e) an electric control unit comprising a printed circuit board for receiving instructions from a user via an interface and for controlling the in-line heater and the pump; and
  f) one or more electric sensors for sensing at least one operational characteristic selected from characteristics of the brewing unit, the in-line heater, the pump, a liquid reservoir, an ingredient collector, a flow of the liquid, a pressure of the liquid and a temperature of the liquid, and for communicating the characteristic(s) to the control unit; and
connecting components a) to f) for assembling the beverage machine, by pre-assembling at least two or three modules, with each module being fully automatically assembled from at least two of components a) to f), wherein the components of the fully automatically pre-assembled modules are configured with spatial reference portions to be automatically seizable, orientable, positionable and fully connectable to each other in one or more automatic assembly steps;
wherein one of the modules is a control module comprising the electric control unit and the electric sensor(s) for sensing the operational characteristic(s), with the electric sensors having rigid connectors comprising rigid connection pins cooperating with corresponding sockets that are automatically connectable onto the electric control unit, with the rigid connectors extending from the electric sensors to the control unit; and wherein the control unit comprises a housing for enclosing a printed circuit board, wherein the electric sensor(s) with the rigid connectors are allowed to extend from the control unit through the housing.

18. The process of claim 17, wherein the control unit comprises a printed circuit board having a portion comprising a hall sensor of a flow meter which is rigidly mounted onto the portion so that the sensor is assembled to the flow meter.

19. The process of claim 18, wherein the control unit comprises a housing with a through-opening through which the flow-meter extends from the printed circuit board for connection within a fluid circuit extending outside the housing.

* * * * *